US012658387B2

(12) United States Patent
Trichon et al.

(10) Patent No.: US 12,658,387 B2
(45) Date of Patent: Jun. 16, 2026

(54) SWITCHING SYSTEM OF AN ELECTRICAL DEVICE

(71) Applicant: Schneider Electric Industries SAS, Rueil Malmaison (FR)

(72) Inventors: François Trichon, Saint Martin d'Uriage (FR); André Triozon, Macon (FR); Denis Milan, Voiron (FR); Jean-Michel Bonfils, Grenoble (FR); Jean-Philippe Claeys, Meylan (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 211 days.

(21) Appl. No.: 18/288,151

(22) PCT Filed: Apr. 26, 2022

(86) PCT No.: PCT/FR2022/050791
§ 371 (c)(1),
(2) Date: Oct. 24, 2023

(87) PCT Pub. No.: WO2022/229553
PCT Pub. Date: Nov. 3, 2022

(65) Prior Publication Data

US 2024/0212954 A1 Jun. 27, 2024

(30) Foreign Application Priority Data

Apr. 26, 2021 (FR) ....................................... 2104304

(51) Int. Cl.
*H01H 33/14* (2006.01)

(52) U.S. Cl.
CPC ................................ *H01H 33/143* (2013.01)

(58) Field of Classification Search
CPC .. H01H 33/143; H01H 33/121; H01H 33/122; H01H 33/6661; H01H 9/38;
(Continued)

(56) References Cited

U.S. PATENT DOCUMENTS 2,480,622 A * 8/1949 Warnock ............ H01H 33/6661 218/12
2,773,154 A 12/1956 Ernest
(Continued)

FOREIGN PATENT DOCUMENTS

CN 1148255 A 4/1997
CN 105122412 A 12/2015
(Continued)

OTHER PUBLICATIONS

International Search Report and English translation dated Sep. 16, 2022 for corresponding International Patent Application No. PCT/FR2022/050791, 4 pages.

*Primary Examiner* — William A Bolton
(74) *Attorney, Agent, or Firm* — Quinn IP Law

(57) ABSTRACT

A switching system includes a vacuum breaker, a driving plate, a main switch, and a contact-maintaining element. The vacuum breaker includes a fixed electrode, and a mobile electrode configured to move between a closed position and an open position. The driving plate is connected to the mobile electrode. The main switch is configured to move between a first position allowing electrical current to pass in a main circuit and a second position preventing electrical current from passing in the main circuit. The main switch is configured to drive the driving plate during a transition from the first position to the second position to cause the mobile electrode to make a transition from the closed position to the open position. The contact-maintaining element is config-
(Continued)

A B C D E F ured to maintain contact between the driving plate and the main switch and limit acceleration of the driving plate.

20 Claims, 16 Drawing Sheets

(58) Field of Classification Search
CPC .. H01H 31/003; H01H 33/165; H01H 33/168; H01H 2033/566
USPC ....... 218/40, 12, 45, 55, 84; 200/15, 48 KB, 200/50.39, 254
See application file for complete search history.

(56) References Cited

U.S. PATENT DOCUMENTS 3,571,543 A * 3/1971 Perkins ................ H01H 33/022 218/119
3,824,359 A * 7/1974 Date .................... H01H 33/127 218/10
8,581,135 B2 * 11/2013 Piccoz ................. H01H 33/126 218/120
8,969,748 B2 * 3/2015 Endre ...................... H01H 1/42 200/254
9,058,948 B2 * 6/2015 Grosjean ............. H01H 33/126
9,679,724 B2 * 6/2017 Abrahamsen ........ H01H 33/128

FOREIGN PATENT DOCUMENTS

CN 108885957 A 11/2018
CN 111613478 A 9/2020
CN 112509859 A 3/2021
FR 2980632 A1 3/2013
WO WO2017066519 A1 4/2017

* cited by examiner

SWITCHING SYSTEM OF AN ELECTRICAL DEVICE

TECHNICAL FIELD

The present invention relates to the field of medium-voltage vacuum breaker switching devices, which comprise components known as vacuum breakers or vacuum interrupters. Vacuum breakers are used for example in medium-voltage, which is to say from 1 to 52 kV, electrical distribution devices. The vacuum breakers are notably associated with actuators to cut off the current in part of an electric circuit.

PRIOR ART

Arranging a vacuum breaker in a branch parallel to a main branch containing a main switch for one phase of an electrical device is known, notably from patent EP2182536. In such an architecture, no current passes in the vacuum breaker during normal operation, which is to say when the main switch is closed so as to cause the current to circulate through the main branch. During the operation of opening of the main switch, a part of the main switch closes the parallel branch containing the vacuum breaker before the current in the main branch is interrupted. The current is then interrupted in the main branch, so that all of the current then passes through the vacuum breaker. As it continues its opening travel, the main switch drives the plate connected to a mobile electrode of the vacuum breaker, and this opens the contact of the vacuum breaker. The electric current is thus cut off. This then avoids the creation of an electrical arc in the main switch, because the electrical current is passing only in the vacuum breaker at the moment at which the current is cut off. Because the vacuum breaker has electrical current passing through it only during transient phases of cutting off the current, this breaker can be simplified and smaller in size in comparison with the vacuum breakers generally intended to be placed in series with the main switch.

In order to guarantee effective cutting-off of the current, the main circuit must be opened (broken) in under around 30 milliseconds. The relative speed between the switch and the driving plate of the vacuum breaker, at the moment at which the two components come into contact with one another is high enough to create an impact shock. This impact shock is liable to cause the plate to bounce relative to the switch, which is to say that the mechanical contact between the two components is temporarily no longer assured. A parasitic electrical arc may thus be created between the driving plate and the switch, in addition to the controlled electrical arc that is created within the vacuum breaker. There are various reasons why this parasitic electrical arc is to be avoided. On the one hand, the parasitic electrical arc has a tendency to erode the plate, which is to say that it wears away the surface for contact between the plate and the switch, thereby impairing long-term reliability. In addition, the parasitic electrical arc encourages re-arcing of the electric circuit after the current has been cut off, and this may damage the devices connected to the circuit. Also, the electrical arc may potentially be created between two distinct phases of the device, with the risk of severely damaging the device.

It is therefore desirable to have a solution for avoiding the creation of a parasitic electrical arc during the phase of opening of the main switch.

SUMMARY

To this end, the invention proposes a switching system for switching an electrical device, comprising:

- a vacuum breaker comprising:
  - a fixed electrode,
  - a mobile electrode, configured to move between:
    - first position, referred to as closed position, in which the fixed electrode and the mobile electrode are in contact with one another so as to allow electrical current to pass, and
    - a second position, referred to as open position, in which the fixed electrode and the mobile electrode are separated from one another so as to prevent electrical current from passing
- a driving plate connected to the mobile electrode,
- a main switch able to move between a first position allowing electrical current to pass in a main electric circuit of the electrical device and a second position preventing electrical current from passing in the main electric circuit,
- the main switch being configured to drive the driving plate during the transition from the first position to the second position, so as to cause the mobile electrode to make the transition from the closed position to the open position,
- a contact-maintaining element configured to maintain mechanical and electrical contact between the driving plate and the main switch while the driving plate is being driven by the main switch.

The contact-maintaining element makes it possible to maintain mechanical contact between at least a portion of the main switch and a portion of the driving plate. Electrical contact between the driving plate and the main switch is thus maintained. As a result, the creation of a parasitic electrical arc between the driving plate and the main switch is avoided. Premature wearing of the switching system is avoided. Likewise, the risk of premature damage to the electrical device as a result of poor breaking of the current is eliminated. The life and the reliability of the switching system and of the electrical device are improved.

The features listed in the following paragraphs may be implemented independently of one another or in any technically possible combination:

According to one embodiment of the switching system, the contact-maintaining element comprises an electrically conducting elastically deformable element configured to be elastically stressed in response to the movement of the main switch from the first position to the second position. More specifically, the electrically conducting elastically deformable element is configured to be elastically stressed in response to the movement of the main switch from the first position to the second position when the distance between the driving plate and the main switch becomes less than a predetermined distance.

The elastically deformable element is configured to relax elastically in response to an increase in the distance between the driving plate and the main switch so as to maintain contact between the driving plate and the main switch.

If the distance between the driving plate and the main switch increases, as a result of the driving plate bouncing back off the main switch, the elastically deformable element relaxes and continues to ensure mechanical contact and, therefore, electrical contact, between the main switch and the driving plate.

The predetermined distance is comprised between 2 millimetres and 6 millimetres.

A natural frequency of the elastically deformable element is higher than 2000 Hz.

This range of natural frequencies allows the elastically deformable element to maintain contact with the driving plate if the latter moves away from the main switch as a result of the initial impact shock between these two components during the driving phase.

According to one exemplary embodiment of the switching system, the elastically deformable element is connected to the main switch.

The elastically deformable element comprises a projecting portion projecting from the main switch in the direction of travel of the main switch from the first position to the second position.

The elastically deformable element is a torsion spring.

The elastically deformable element is formed from metal wire.

The diameter of the metal wire is between 0.5 millimetres and 3 millimetres.

The torsion spring is made from a copper and beryllium alloy.

This alloy is able to provide good elastic properties and good thermal resistance so that the torsion spring is able to withstand the heating created by the transient passage of the electrical current upon each opening (breaking) of the circuit through movement of the main switch.

The main switch comprises a first bar and a second bar, the first bar and the second bar being distant from one another. The first bar and the second bar are parallel to one another. The first bar and the second bar are in contact with a fixed contact of the main circuit when the main switch is in the position in which the main circuit is closed. The first bar and the second bar are connected by a transverse connecting spindle. The connecting spindle passes through a coil of the torsion spring.

The connecting spindle connecting the first bar and the second bar comprises a groove to receive the coil of the torsion spring.

The torsion spring is thus held in place with respect to the connecting spindle without the addition of further components.

The torsion spring comprises a first strand and a second strand which are connected by a coil. An end portion of the first strand is placed in a cutout in the first bar and an end portion of the second strand is placed in the cutout of the first bar.

The retaining spring is thus retained relative to the first bar without the addition of further components. In addition, the choice of the size of the cutout makes it possible to regulate the amount of preload, or prestress, in the spring.

The axis of the coil is parallel to the end portion of the first strand and the end portion of the second strand.

This makes the placement of the coil of the retaining spring in the receiving groove of the connecting spindle and the placement of the ends of the retaining spring in the cutout in the first bar easier.

According to one exemplary embodiment, the cutout is oblong in shape.

As an alternative, the cutout is rectangular in shape.

The first strand comprises a substantially rectilinear portion adjacent to the coil and a bent portion, the bent portion being extended by a connecting portion connecting it to the end portion of the first strand.

The substantially rectilinear portion of the first strand and the bent portion extend in a plane substantially perpendicular to an axis of the coil.

The second strand comprises a substantially rectilinear portion adjacent to the coil and a connecting portion connecting it to the end portion of the second strand.

In the unconstrained state, the substantially rectilinear portion of the first strand and the rectilinear portion of the second strand form an angle of between 0° and 40°.

According to one exemplary embodiment, the torsion spring is preloaded.

The preloading of the torsion spring makes it possible to ensure good electrical contact with the driving plate if the driving plate bounces back off the main switch.

The preload in the torsion spring is between 15 newtons and 50 newtons, and notably around 25 newtons.

According to one exemplary embodiment of the switching system, the elastically deformable element is connected to the driving plate.

The elastically deformable element projects from the driving plate.

The elastically deformable element is an elastic strip configured to deform in bending.

The elastic strip has a first portion rigidly connected to the driving plate and a free second portion.

The free portion comprises a portion bent into a U-shape adjacent to the portion that is rigidly connected to the driving plate.

The free portion of the elastically deformable strip projects from the driving plate.

The elastic strip is screw fastened into the driving plate.

The elastic strip is made of steel.

The thickness of the elastic strip is comprised between 0.3 millimetres and 0.8 millimetres.

The length of the free portion of the elastic strip is comprised between 1 centimetre and 5 centimetres.

The width of the free portion of the elastic strip is comprised between 1 centimetre and 6 centimetres.

According to another embodiment of the switching system, the contact-maintaining element comprises a damping element configured to limit the acceleration of the driving plate while the driving plate is being driven by the main switch.

According to one embodiment of the switching system, the main switch and the driving plate are configured so that the main switch drives the plate via the contact-maintaining element.

More specifically, the main switch drives the driving plate via the contact-maintaining element during at least part of the travel of the main switch making the transition from the first position to the second position.

According to one embodiment, the contact-maintaining element is secured to the driving plate.

According to another embodiment of the switching system, the contact-maintaining element is secured to the main switch.

According to yet another embodiment of the switching system, the damping element is formed by the driving plate.

According to one embodiment, the contact-maintaining element comprises a block of elastomer.

For example, the contact-maintaining element comprises a damping element made of an elastomer based on EPDM or on polyurethane or on natural rubber or on thermoplastic.

According to one exemplary embodiment, the contact-maintaining element is covered with an electrically conducting layer. The contact-maintaining element may be covered with an electrically conducting strip. The electrically conducting strip may be made of metal, for example steel.

According to one embodiment, the contact-maintaining element comprises a block of elastomer fixed to the driving plate.

For example, the electrically conducting strip that covers the contact-maintaining element comprises a plate and a protrusion projecting from the plate, and the protrusion is placed in a receiving housing of the driving plate.

According to one exemplary embodiment, the protrusion comprises a plurality of studs spaced apart from one another.

The plate is of parallelepipedal shape.

The plate has a thickness comprised between 0.5 and 5 millimetres.

The studs have a thickness comprised between 0.1 and 2 millimetres.

In one exemplary embodiment, the contact-maintaining element is fixed to the driving plate by fixing screws. The fixing screws pass through the plate.

According to another exemplary embodiment, the contact-maintaining element is overmoulded onto the driving plate.

According to one embodiment of the switching system,

- the driving plate comprises a first surface, referred to as bearing surface,
- the main switch comprises a second surface, referred to as driving surface, configured to be in contact with the bearing surface while the main switch is making the transition from the first position to the second position, the main switch is able to rotate about an axis and comprises an end portion, opposite to the axis, and the driving surface is adjacent to the end portion.

According to one embodiment, the bearing surface is formed on an electrically conducting strip that covers the contact-maintaining element.

According to one embodiment, the contact-maintaining element comprises the bearing surface of the driving plate.

According to another embodiment, the switching system comprises a connecting element connecting the driving plate to the mobile electrode, and the contact-maintaining element is positioned between the connecting element and the driving plate. For example, a damping element is placed between the connecting element and the driving plate.

According to one embodiment, the switching system comprises a connecting element connecting the driving plate to the mobile electrode, the connecting element comprising a pivot and an end stop, and the driving plate is configured to bear against the end stop when the main switches is making the transition from the first position to the second position so that the main switch drives the connecting element.

According to one exemplary embodiment, the contact-maintaining element is placed on the driving plate and the contact-maintaining element is configured to bear against the end stop.

As an alternative, the end stop of the connecting element is formed by the contact-maintaining element.

According to one embodiment, the driving plate is configured to pivot about the pivot without driving the connecting element when the main switch is making the transition from the second position to the first position.

The driving plate comprises an electrically conducting zone configured to be in contact with the main switch when the main switch is making the transition from the first position that allows electrical current to pass in a main electric circuit, to the second position that prevents the passage of electrical current in the main electric circuit.

More specifically, the electrically conducting zone of the driving plate is in contact with the main switch during at least part of the travel of the main switch making the transition from the first position to the second position.

According to another embodiment of the switching system, the contact-maintaining element comprises a sliding-contact element configured to create a sliding electrical contact between the main switch and the driving plate while the driving plate is being driven by the main switch.

As a preference, the sliding-contact element is made of metal.

Thus, the sliding-contact element makes it possible to ensure electrical continuity between the main switch and the driving plate.

According to one embodiment, the sliding-contact element is secured to the driving plate.

According to one aspect of the invention, the main switch comprises a contact surface, and the sliding-contact element is configured to come into contact with the contact surface while the driving plate is being driven by the main switch.

Advantageously, the contact surface extends in a plane perpendicular to the axis of rotation of the main switch.

According to one embodiment, the main switch comprises an electrical-connection surface configured to be in contact with a fixed contact of the main circuit when the main switch is in the position in which the main circuit is closed, and the electrical-connection surface is adjacent to the contact surface.

The electrical-connection surface and the contact surface may partially overlap one another.

The electrical-connection surface and the contact surface may be coincident.

According to one aspect of the invention, the main switch comprises a first bar and a second bar, the first bar and the second bar being distant from one another and parallel to one another, the first bar and the second bar being in contact with a fixed contact of the main circuit when the main switch is in the position in which the main circuit is closed. The fixed contact of the main circuit is placed between the first bar and the second bar when the main switch is in the position in which the main circuit is closed,

- each of the first bar and second bar comprises a contact surface, and the sliding-contact element is configured to come into contact with each sliding-contact surface while the driving plate is being driven by the main switch.

Each bar of the main switch comprises an electrical-connection surface configured to be in contact with the fixed contact when the main switch is in the first position, and the contact surface is adjacent to the electrical-connection surface.

The contact surface of the second bar is placed facing the contact surface of the first bar.

As a preference, the first bar is planar. The second bar is planar.

The first bar and the second bar are made of metal.

The sliding-contact element comprises a flexible blade extending perpendicular to the driving plate, the flexible blade being configured to create a sliding contact with the main switch.

The sliding-contact element may comprise a first flexible blade and a second flexible blade, and the first flexible blade is configured to come into contact with a contact surface of the first bar and the second flexible blade is configured to come into contact with a contact surface of the second bar.

The first flexible blade comprises an inclined portion, the inclined portion facing towards the second flexible blade. The second flexible blade comprises an inclined portion, the inclined portion facing towards the first flexible blade.

The sliding-contact element has a U-shaped profile.

Each flexible blade the forms one branch of the U.

The first flexible blade and the second flexible blade are connected by a base perpendicular to the plane of the first flexible blade and of the second flexible blade.

The base of the U forms a fixing surface for fixing to the driving plate.

The base of the U comprises a through-holes for the passage of a fixing screw for fixing the sliding-contact element to the driving plate.

According to another embodiment of the switching system, the sliding-contact element comprises a rigid main rod extending perpendicular to the driving plate, the main rod is surrounded by a plurality of flexible rods extending transversely to the main rod, and the flexible rods are configured to create a sliding contact with the main switch.

The sliding-contact element comprises a plurality of rows of flexible rods extending axially along the main rod. The flexible rods are distributed at 360° all around the main rod.

The flexibility of the transverse rods allows the application of the friction force acting between the sliding-contact element and the main switch to be progressive.

According to yet another embodiment, the sliding-contact element comprises a rigid main rod extending perpendicular to the driving plate, the main rod is surrounded by a spring with angled coils, and the angled coils are configured to create sliding contact with the main switch.

Like with the preceding embodiment, the flexibility of the coils of the spring enable the establishment of the sliding contact between the sliding-contact element and the main switch to be progressive.

According to yet another embodiment, the sliding-contact element comprises a rigid rod extending perpendicular to the driving plate, and the rigid rod is configured to create sliding contact with the main switch.

According to one exemplary embodiment, the rigid rod has a rectangular cross section.

The rigid rod is chamfered.

According to an alternative form of embodiment, the rigid rod has a circular cross section.

The invention also relates to an electrical device comprising a switching system as described hereinabove, wherein the vacuum breaker is placed in parallel with the main switch.

BRIEF DESCRIPTION OF THE DRAWINGS

Further features, details and advantages will become apparent from reading the following detailed description and from studying the attached drawings in which.

DESCRIPTION OF THE EMBODIMENTS

To make the figures easier to read, the various elements are not necessarily drawn to scale. In these figures, elements that are identical bear the same references. Certain elements or parameters may be indexed, which is to say designated for example as first element or second element, or else first parameter and second parameter, etc. This indexing is intended to differentiate elements or parameters that are similar but not identical. This indexing does not imply that one element or parameter takes priority over another, and the denominations may be interchanged. Where it is specified that a subsystem comprises a given element, that does not exclude there being other elements present in that subsystem.

Figure 1:
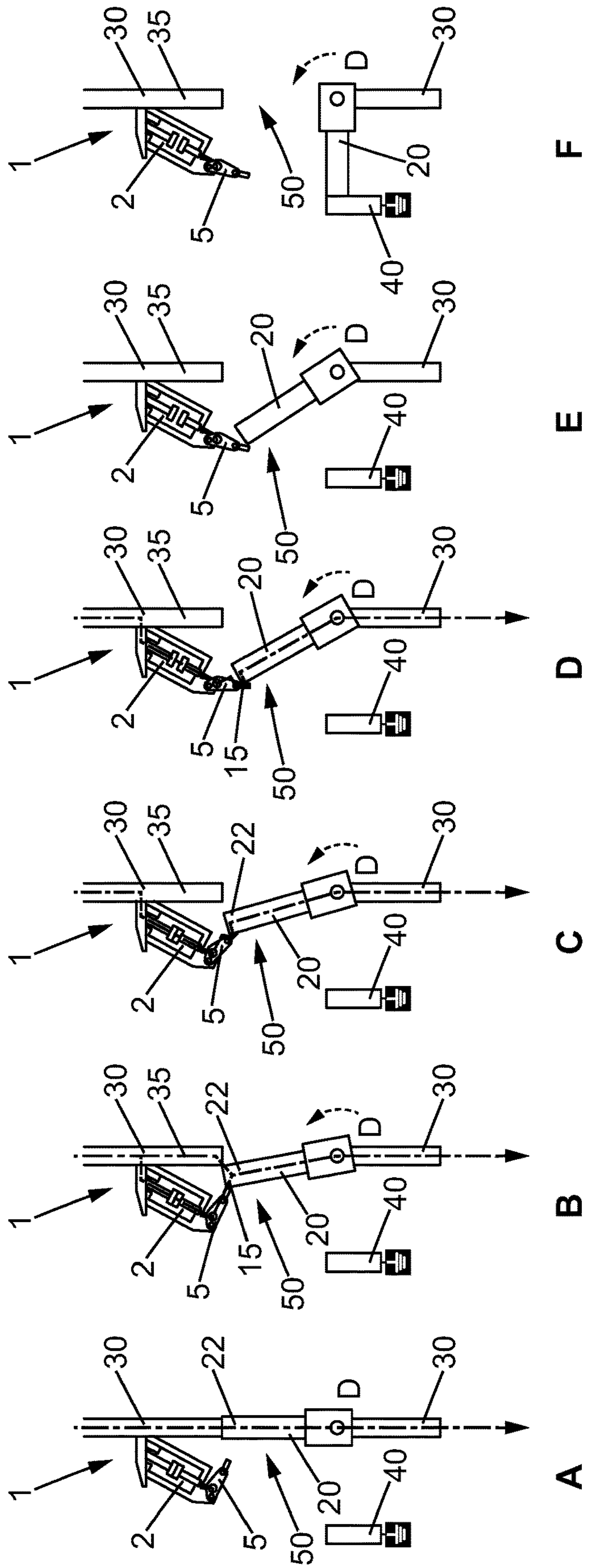
FIG. 1 is a schematic depiction of the operation of an electrical device switching system comprising vacuum breaker.

FIG. 1 schematically depicts an electrical device 1 comprising a switching system 50. The switching system 50 comprises a vacuum breaker 2. The vacuum breaker 2 is placed in parallel with the main switch 20.

The electrical device 1 comprises a main circuit 30 in which an electrical current can circulate. The main circuit 30 corresponds example to one of the phases of the electrical device 1. The switching system 50 makes it possible selectively to cut off the passage of current in the main circuit 30, or to allow current to pass in the main circuit 30. The switching system 50 comprises a main switch 20. The main switch 20 is mobile in rotation.

The vacuum breaker 2 is provided for medium-voltage, which is to say a voltage of between 1 kV and 52 kV, electrical equipment. The vacuum breaker 2 comprises a housing forming a sealed vacuum chamber. What that means is that the pressure prevailing inside the chamber is below 10-4 millibars.

As illustrated in FIG. 1, the main circuit 30 comprises a fixed contact 35. The electrical device 1 here comprises an earthing contact 40. The switch 20 is mobile in rotation between a nominal position for the circulation of electric current in the main circuit 30, illustrated as A in FIG. 1, and a position in which the switch 20 is connected to the earthing contact 40, illustrated as F in that same figure. The main switch 20 can be rotated about an axis D. According to other exemplary embodiments which have not been depicted, it is possible for the earthing contact not to be present. The vacuum breaker 2 forms part of a branch tapped off from the main circuit 30. This tapped-off branch is connected at a first end to the main circuit 30 and ends at its second end in a mobile part. The mobile part is mechanically connected to the mobile electrode 4 of the vacuum breaker 2. The mobile part comprises a driving plate 5.

FIG. 1 schematically describes the successive steps of an operation of cutting off the current in the main circuit 30. Steps A to F are in chronological order. The broken lines ending in an arrow indicate the passage of the current. In B, the main switch 20 has initiated a rotational movement. As it rotates, the main switch 20 will come into contact with and drive the driving plate 5 which is connected to the mobile electrode 4 of the vacuum breaker 2. The driving plate 5, also referred to as contact element, is an element for driving of the mobile electrode 4. The movement of the driving plate 5 thus makes it possible to open (break) the contact in the vacuum breaker 2. The driving plate 5 comprises an electrically conducting element connected to the mobile electrode 4. The main switch 20 comes into contact with the electrically conducting element during part of its travel. The driving plate 5 may pivot about an axis of rotation under the thrust of the main switch 20. The control device that kinematically connects the driving plate 5 and the mobile electrode 4 is not detailed in FIG. 1. In B, electrical contact between the switch 20 and the fixed contact 35 is still established, because of the width of the contacting zones. Electrical contact between the main switch 20 and the vacuum breaker 2 is also made. The main switch 20 is in contact with the driving plate 5 which is electrically conducting and electrically connected to the mobile electrode 4. An electric current circulates simultaneously in the fixed contact 35 and, in parallel, into the vacuum breaker 2. In other words, the electric current circulates both in the main circuit 30 and in the tapped-off branch. In C, the main switch 20 has continued its rotational movement and is no longer in contact with the fixed contact 35. The main switch 20 has begun to move the driving plate 5. The vacuum breaker is closed, which means to say that the fixed electrode 3 and the mobile electrode 4 are in contact. All of the current passes through the vacuum breaker 2. The electric current no longer circulates in the main circuit 30 but does circulate in the tapped-off branch. In D, the main switch 20 has moved the driving plate 5 further, and this has triggered the opening of the vacuum breaker 2. The mobile electrode 4 has thus begun to move away from the fixed electrode 3. The switching system 50 that allows the vacuum breaker 2 to be opened will be described in detail in the paragraphs which follow. The current passes in the vacuum breaker 2 in the form of an electric arc when the contact opens. In E, the driving plate 5 has continued to be driven by the main switch 20 and the separation between the mobile electrode 4 and the fixed electrode 3 is at a maximum. Shortly after the phase current passes through zero, the current in the vacuum breaker 2 is cut off. The current in the main circuit 30 is thus cut off. In F, the main switch 20 has completed its rotational movement and is in contact with the earthing contact 40.

The driving plate 5 comprises an electrically conducting zone 15 configured to be in contact with the main switch 20 when the main switch 20 is making the transition from the first position P1' that allows electrical current to pass in a main electric circuit 30, to the second position P2' that prevents the passage of electrical current in the main electric circuit 30. The electrically conducting zone 15 of the driving plate 5 is in contact with the main switch 20 during at least part of the travel of the main switch 20 making the transition from the first position P1' to the second position P2'. The structure of the driving plate 5 is for example made of plastic.

FIGS. 2 to 8 detail a first embodiment of the invention. The switching system 50 for switching an electrical device 1 comprises:

- a vacuum breaker 2 comprising:
  - a fixed electrode 3,
  - a mobile electrode 4, configured to move between:
    - a first position P1, referred to as closed position, in which the fixed electrode 3 and the mobile electrode 4 are in contact with one another so as to allow electrical current to pass, and
    - a second position P2, referred to as open position, in which the fixed electrode 3 and the mobile electrode 4 are separated from one another so as to prevent electrical current from passing
- a driving plate 5 connected to the mobile electrode 4,
- a main switch 20 able to move between a first position P1' allowing electrical current to pass in a main electric circuit 30 of the electrical device 1 and a second position P2' preventing electrical current from passing in the main electric circuit 30, the main switch 20 being configured to drive the driving plate 5 during the transition from the first position P1' to the second position P2', so as to cause the mobile electrode 4 to make the transition from the closed position P1 to the open position P2,
- a contact-maintaining element 6 configured to maintain mechanical and electrical contact between the driving plate 5 and the main switch 20 while the driving plate 5 is being driven by the main switch 20.

The contact-maintaining element 6 is positioned at the second end of the tapped-off branch comprising the vacuum breaker 2, or at the main switch 20.

In this first embodiment of the switching system 50, the contact-maintaining element 6 comprises a damping element 13 configured to limit the acceleration of the driving plate 5 while the driving plate 5 is being driven by the main switch 20.

Thanks to the damping element 13, the contact-maintaining element 6 makes it possible to reduce the impact shock between the main switch 20 and the driving plate 5 and thus able to avoid a phenomenon whereby the driving plate 5 bounces back off the main switch 20. Because mechanical and electrical contact between the driving plate 5 and the main switch 20 is maintained, there is no parasitic electrical arcing between the driving plate 5 and the main switch 20. Premature wearing of the switching system is thus avoided. Likewise, the current is cut off more reliably and the risk of premature damage to the electrical device is eliminated. The life and the reliability of the switching system and of the electrical device are improved. Contact-maintaining is to be understood as meaning that contact between the components is assured for a duration longer than the duration for which contact would exist in the absence of the contact-maintaining element. Residual bouncing between the components may occur in certain circumstances. In that case, the amplitude of the bouncing is less than 3 millimetres and the duration of the bouncing is less than 1 millisecond. In other words, any bouncing is of amplitude and duration that are low enough for it to be able to be considered that mechanical and electrical contact is maintained during the course of the operation of the main switch 20.

The driving plate 5 is a driving element connected to the mobile electrode 4 of the vacuum breaker 2. In other words, the contact-maintaining element 6 is configured to maintain mechanical and electrical contact between the main switch 20 and the driving plate 5 while the driving plate 5 is being driven by the main switch 20. In particular, the contact-maintaining element 6 is configured to limit the acceleration of the driving plate 5 during an initial phase of the driving of the driving plate 5 by the main switch 20. The contact-maintaining element 6 is configured to limit the acceleration of the driving plate 5 at least during the phase of mating of the main switch 20 with the driving plate 5, which is to say the phase during which the main switch 20 comes into contact with the driving plate 5 and begins to drive same.

Figure 2:
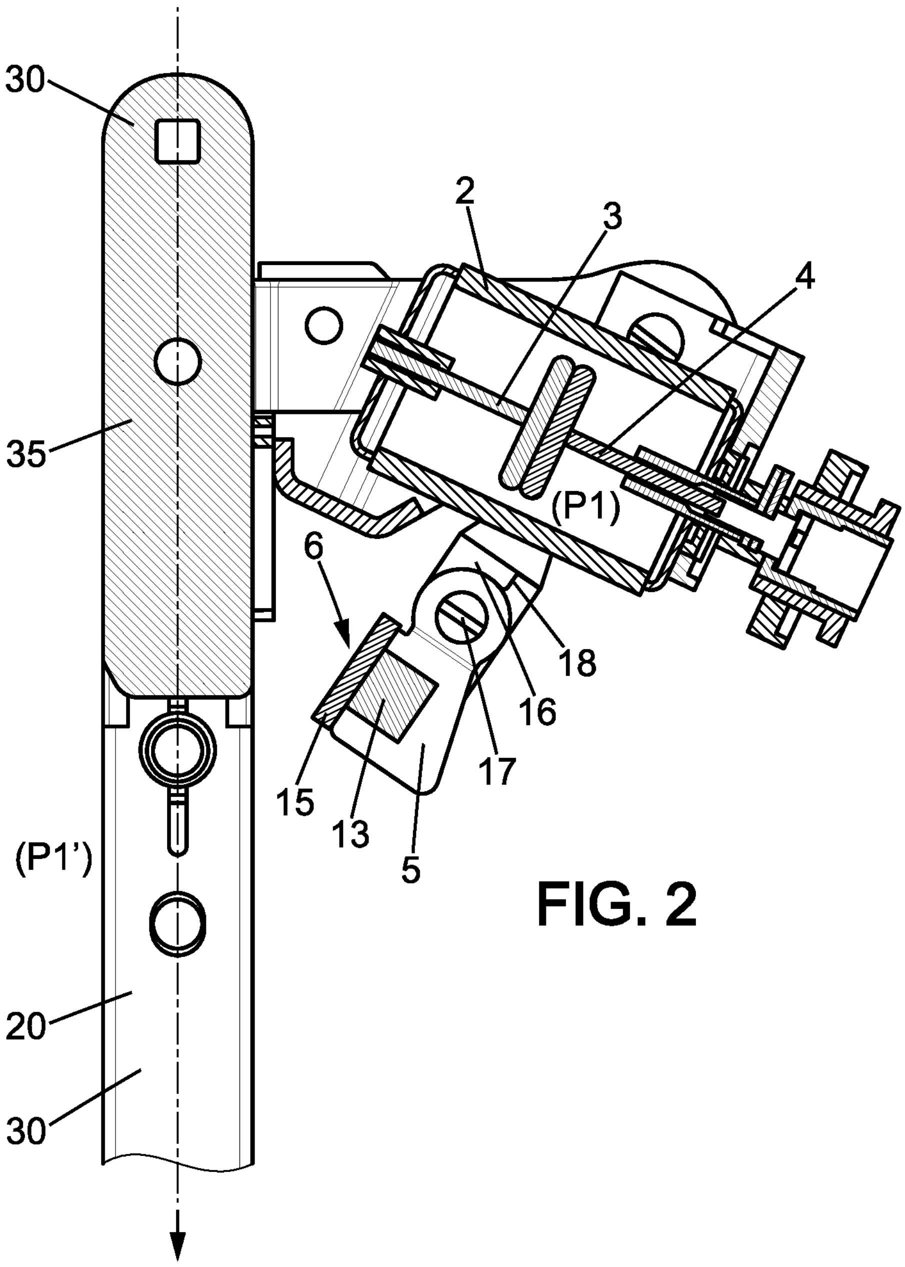
FIG. 2, FIG. 3, FIG. 4, FIG. 5, FIG. 6 are side views illustrating successive steps in the opening of a switching system according to a first embodiment of the invention.
Figure 3:
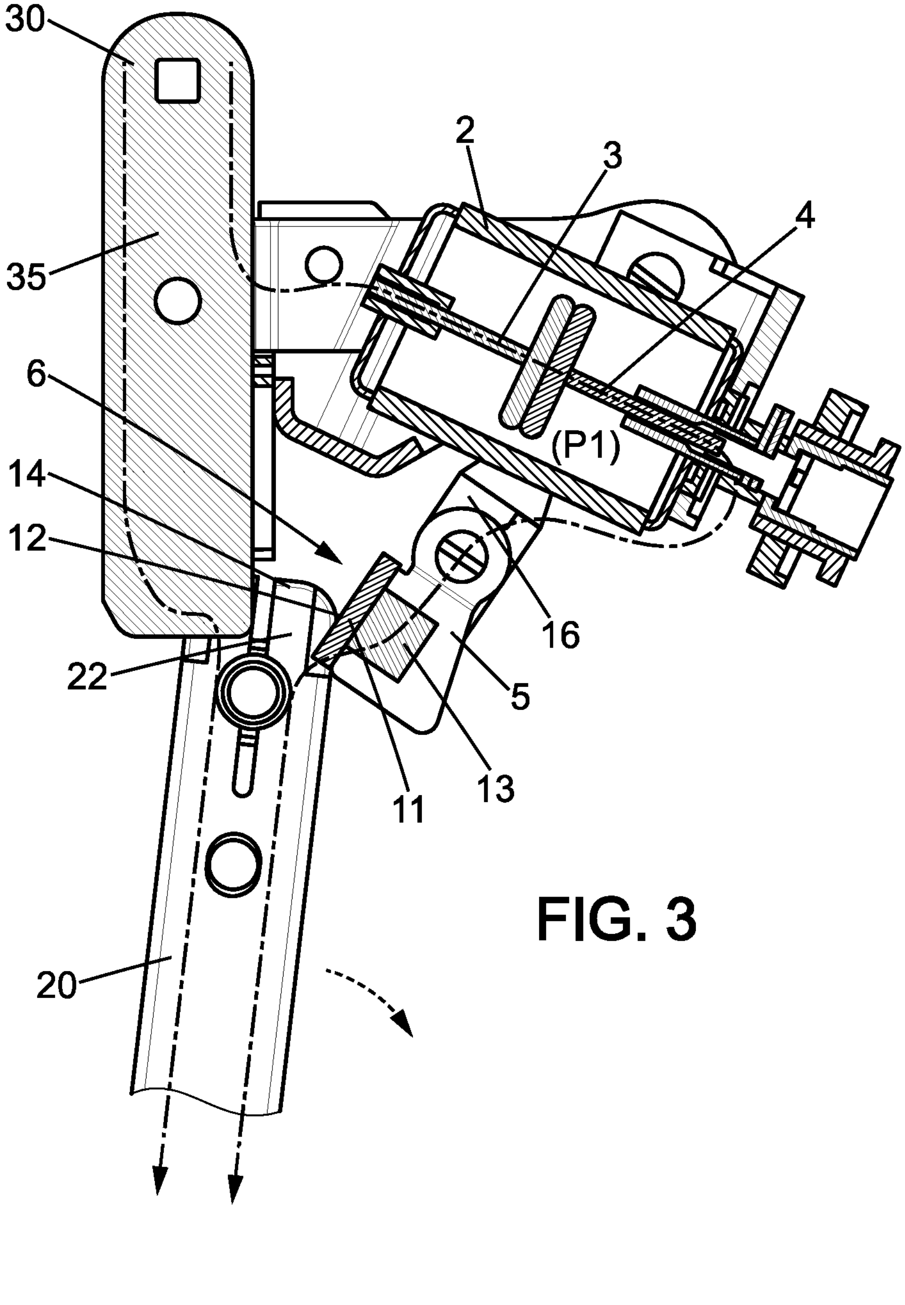
Figure 4:
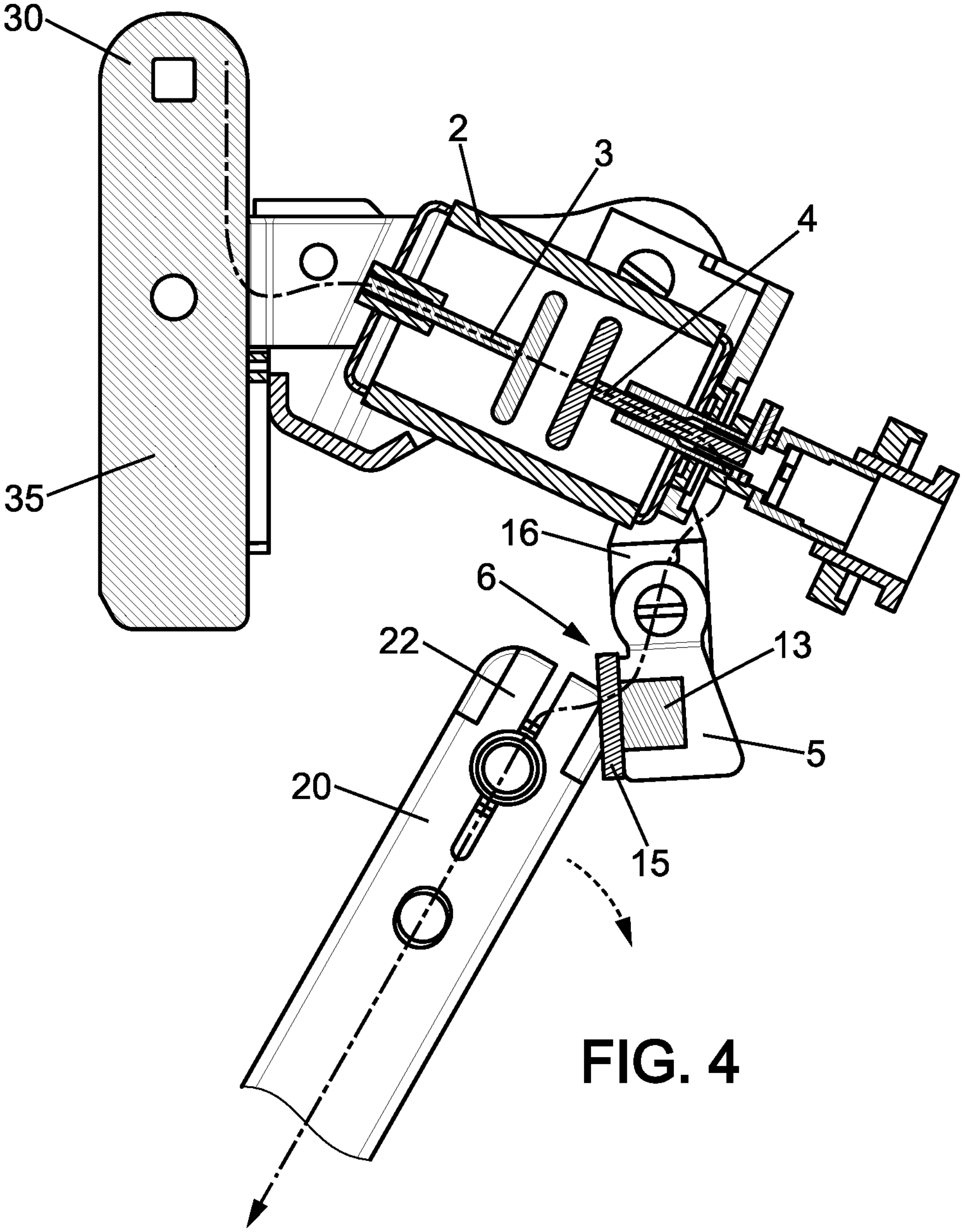
Figure 5:
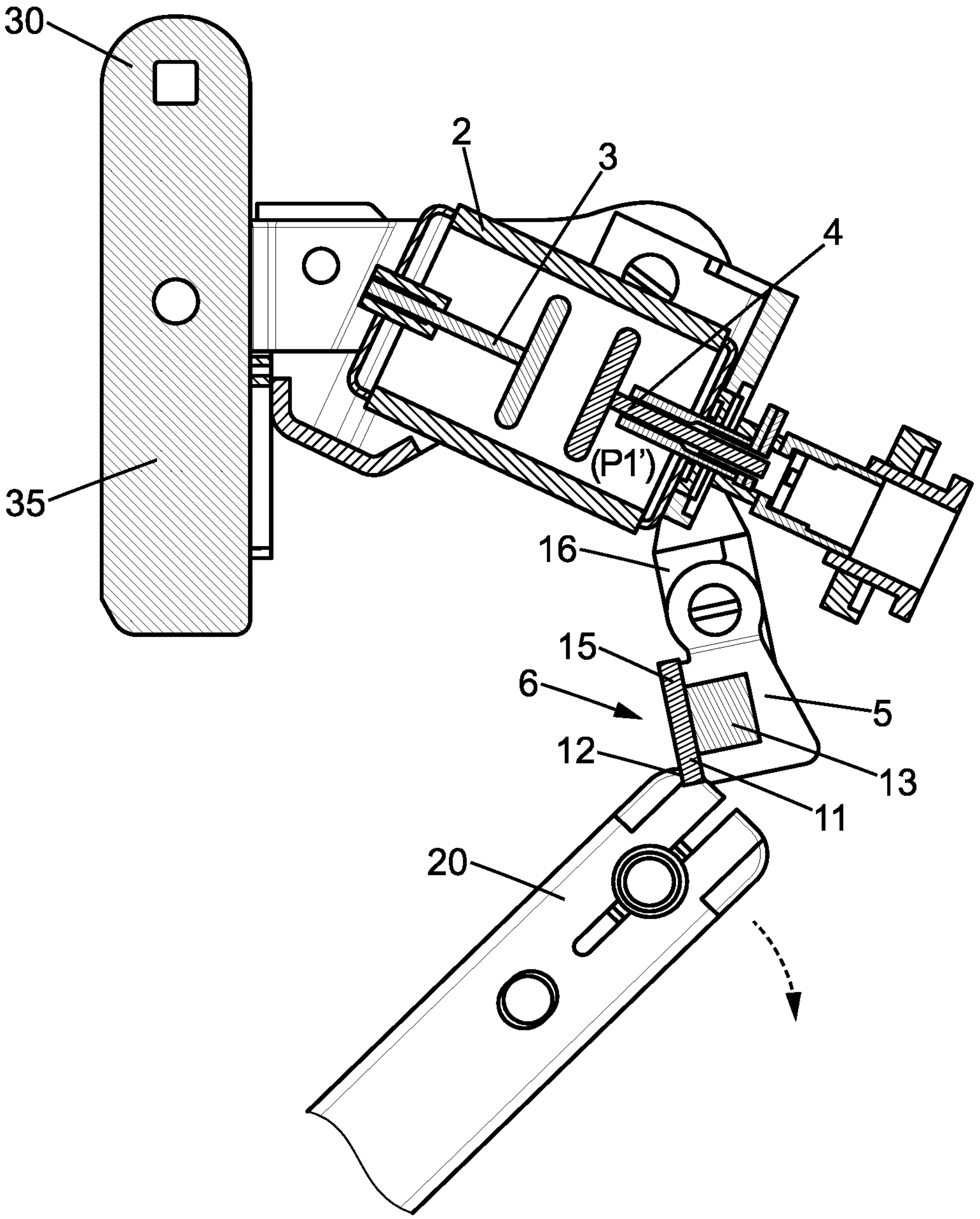
Figure 6:
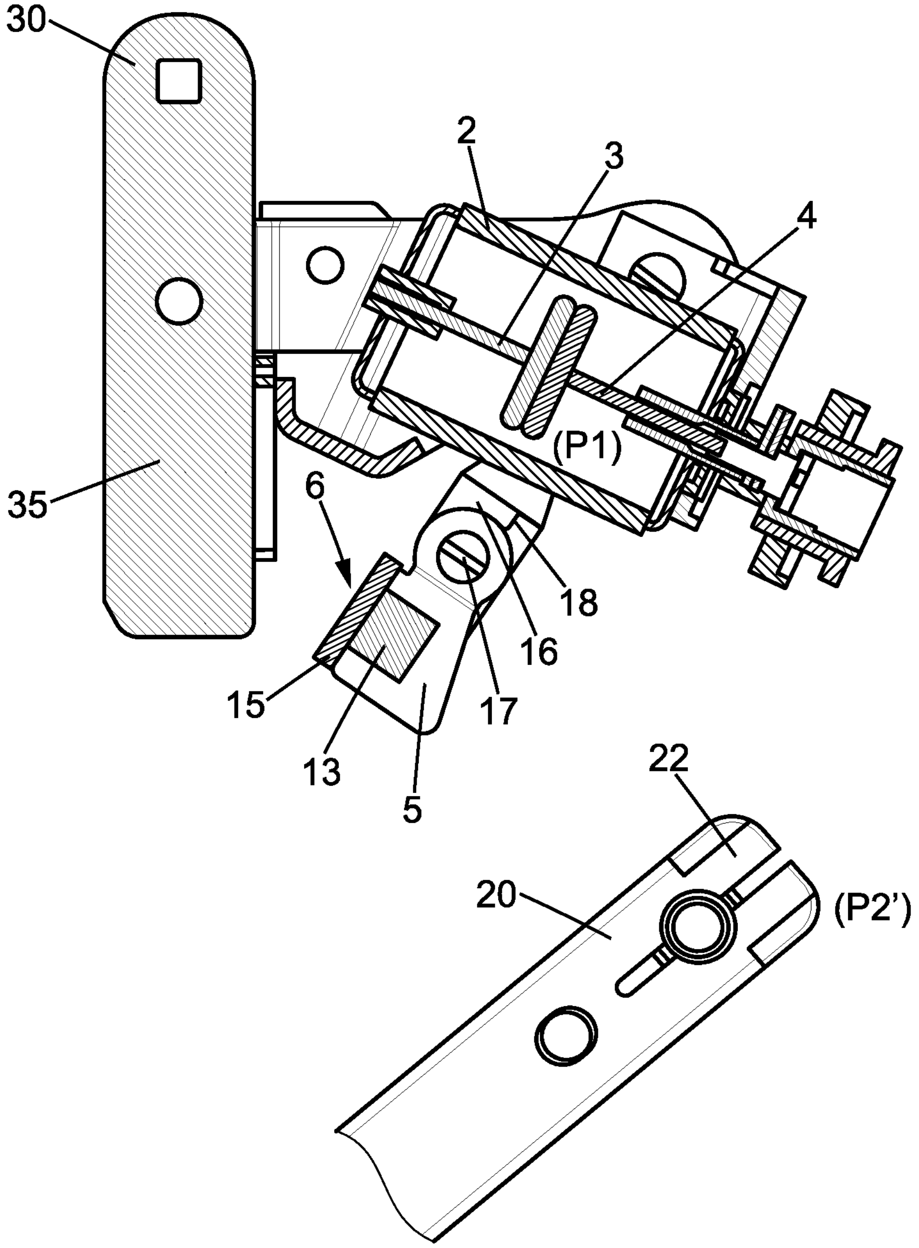

FIGS. 2 to 6 detail various steps in the travel of the switch 20 with a view to opening (breaking) the main circuit 30. The fixed electrode 3 and the mobile electrode 4 form an electrical contact. An electric current may pass in the contact when the fixed electrode 3 and the mobile electrode 4 are pressed against one another, as illustrated in FIG. 2 and in FIG. 3. In FIG. 4, an electric arc is present between the two electrodes of the vacuum breaker, and precedes the cutting-off of the current. The current in the contact is interrupted when the mobile electrode 4 and the fixed electrode 3 are moved away from one another as illustrated in FIG. 5. In FIG. 6, the switch 20 has pivoted far enough to no longer be in contact with the driving plate 5. In FIGS. 2 to 6, broken lines indicate the passage of the electric current.

According to a first embodiment, illustrated in FIGS. 2 to 8, the main switch 20 and the driving plate 5 are configured so that the main switch 20 drives the driving plate 5 via the contact-maintaining element 6.

More specifically, the main switch 20 drives the driving plate 5 via the contact-maintaining element 6 during at least part of the travel of the main switch 20 making the transition from the first position P1' to the second position P2'. Thus, the damping element 13 is interposed between the main switch 20, the electrically conducting zone 15, and the driving plate 5 during at least part of the travel of the main switch 20 making the transition from the first position P1' to the second position P2'. The main switch 20 comes into contact with the driving plate 5 via the electrically-conducting zone 15 and the damping element 13. In other words, the mating of the main switch 20 with the driving plate 5 is via the electrically-conducting zone 15 and the damping element 13.

For that purpose, the contact-maintaining element 6 is covered with an electrically conducting strip 15. The strip 15 is made of metal, for example steel. In other words, the electrically-conducting zone of the driving plate 5 is formed here by the strip 15. The contact-maintaining element 6 may also be covered with an electrically conducting layer.

In the example illustrated, the contact-maintaining element 6 is secured to the driving plate 5. In an embodiment variant which has not been depicted, the contact-maintaining element 6 may be secured to the main switch 20. More specifically, the damping element 13 is then secured to the main switch 20.

In the first embodiment, the contact-maintaining element 6 comprises a damping element 13. The damping element 13 is a block of elastomer. The elastomer may be based on EPDM (a copolymer of ethylene-propylene-diene monomer) or on thermoplastic or on polyurethane or on natural rubber.

According to the first embodiment, illustrated in FIGS. 2 to 8, the contact-maintaining element 6 comprises a block of elastomer fixed to the driving plate 5.

Figure 7:
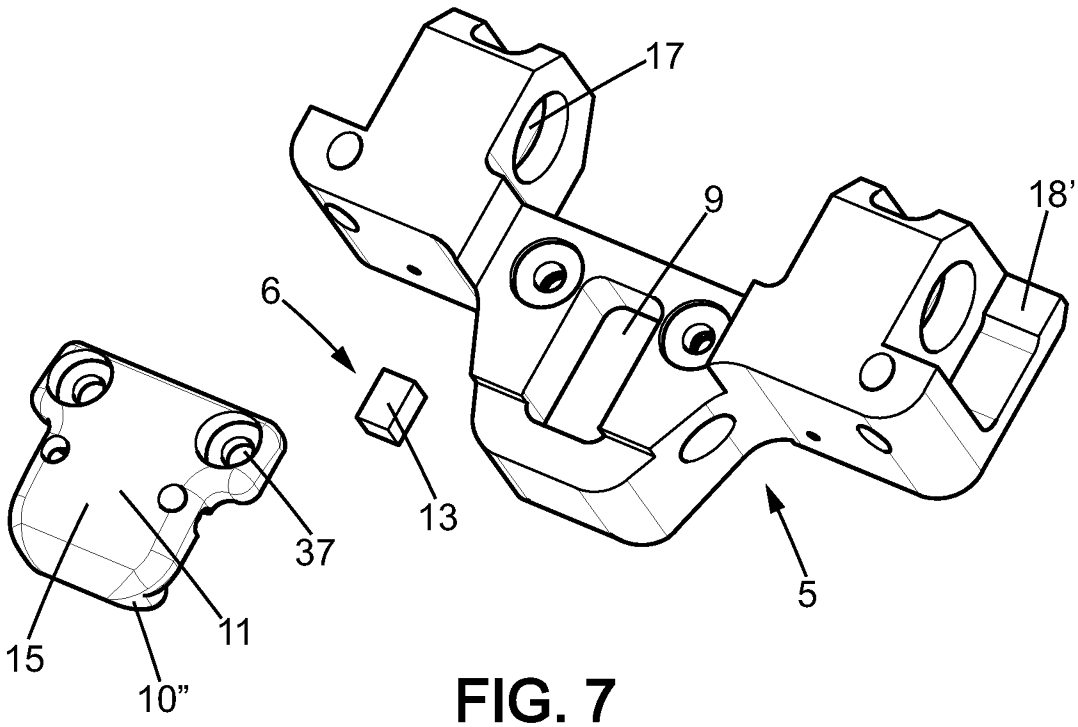
FIG. 7 is a perspective partial view of the switching device according to the first embodiment of the invention.
Figure 8:
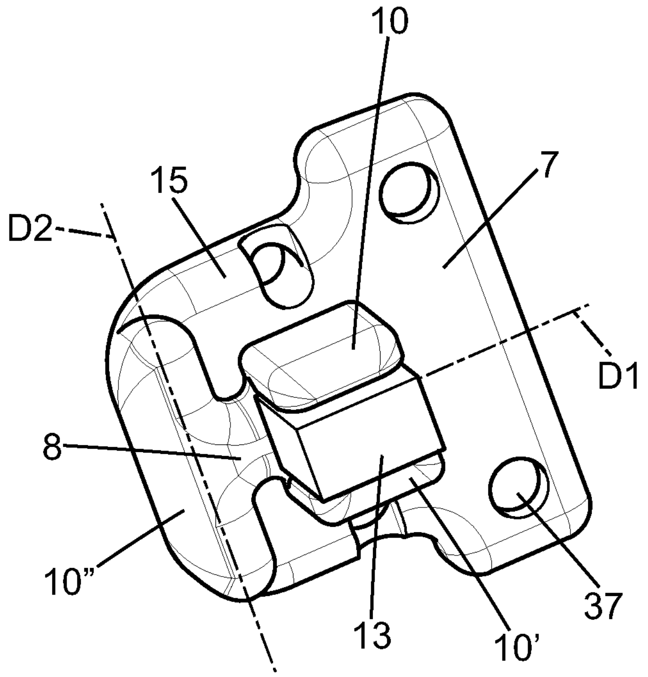
FIG. 8 is another perspective partial view of the switching device according to the first embodiment of the invention.

FIG. 7 and FIG. 8 detail, in exploded view, one exemplary embodiment of a contact-maintaining element 6 comprising a damping element 13 made of elastomer.

The electrically-conducting strip 15 covers the contact-maintaining element 6 which, here, comprises the damping element 13. The strip 15 comprises a plate 7 and a protrusion 8 projecting from the plate 7, and the protrusion 8 is placed in a receiving housing 9 of the driving plate 5. During the assembly phase, the protrusion 8 is able to slide in a receiving housing 9 of the driving plate 5. The damping element 13 is inserted into the driving plate 5 and the protrusion 8 of the strip 15 slides in the receiving housing 9 until the strip 15 has come to bear against the damping element 13. The strip 15 is connected to the driving plate 5 via the damping element 13. The damping element 13 is pressed against the bottom of the receiving housing 9. The desired damping properties are obtained through the choice of the dimensions and the material of the damping element.

As depicted in FIG. 8, the protrusion 8 comprises a plurality of studs 10, 10', 10" spaced apart from one another. The plate 7 is of parallelepipedal shape. The plate 7 has a thickness comprised between 0.5 and 5 millimetres. The studs 10 have a thickness comprised between 0.1 and 2 millimetres. The protrusion 8 here comprises two studs 10, 10' of parallelepipedal shape, extending in a main direction D1. The protrusion 8 comprises a third stud 10", of parallelepipedal shape, extending in a transverse direction D2 perpendicular to the direction D1.

The thickness of the damping element 13, and the material used, make it possible to adjust the damping effect obtained so as to ensure that electrical and mechanical contact between the strip 15, the driving plate 5 and the main switch 20 is maintained during the opening (breaking) travel of the vacuum breaker 2. In the example depicted, the strip 15 is fixed to the driving plate 5 by fixing screws that allow the damping element 13 to be compressed. The fixing screws pass through the plate 7. In FIG. 7, the fixing screws have not been depicted, only the through-holes 37 for the fixing screws being visible.

Other forms of damping element 13 are also conceivable according to the invention. According to another exemplary embodiment, not depicted, the damping element 13 may for example be overmoulded onto the driving plate 5.

As depicted notably in FIG. 3,

- the driving plate 5 comprises a first surface 11, referred to as bearing surface,
- the main switch 20 comprises a second surface 12, referred to as driving surface, configured to be in contact with the bearing surface 11 while the main switch 20 is making the transition from the first position P1' to the second position P2', the main switch 20 is able to rotate about an axis D and comprises an end portion 14, opposite to the axis D, and the driving surface 12 is adjacent to the end portion 14.

The contact-maintaining element 6 comprises the bearing surface 11 of the driving plate 5. The zone in which contact between the contact-maintaining element 6 and the main switch 20 occurs varies according to the angular position of the main switch 20. The bearing surface 11 here forms part of the electrically conducting strip 15.

The switching system 50 comprises a connecting element 16 connecting the driving plate 5 to the mobile electrode 4. As depicted in FIG. 2 and detailed in FIG. 7, the switching system 50 comprises a connecting element 16 connecting the driving plate 5 to the mobile electrode 4, the connecting element 16 comprising a pivot 17 and an end stop 18, and the driving plate 5 is configured to bear against the end stop 18 when the main switch 20 is making the transition from the first position P1' to the second position P2' so that the main switch 20 drives the connecting element 16. A portion 18' of the driving plate 5 is in contact with the end stop 18 of the connecting element 16. In other words, when, in FIGS. 2 to 5, the main switch 20 pivots as indicated schematically by the curved arrow in dotted line, the driving plate 5 and the connecting element 16 are rigidly connected such that the movement of the main switch 20 is transmitted to the mobile electrode 4 of the vacuum breaker 2.

According to one embodiment which has not been depicted, the contact-maintaining element 6 is placed between the connecting element 16 and the driving plate 5. In other words, a damping element 13 is placed between the connecting element 16 and the driving plate 5. Thus, the damping element 13 may be placed on the driving plate 5, and the damping element 13 is configured to bear against the end stop 18. The damping element 13 may thus be placed on the portion designated 18' in FIG. 7. According to another embodiment which has not been depicted, the end stop 18 of the connecting element 16 may be formed by the damping element 13. In other words, in this embodiment, contact between the main switch 20 and the driving plate 5 occurs without any damping element interposed between these two components. The damping element is interposed in the connection between the driving plate 5 and the connecting element 16.

The driving plate 5 is configured to pivot about the pivot 17 without driving the connecting element 16 when the main switch 20 is making the transition from the second position P2' to the first position P1'. Thus, the main switch 20 may resume its initial position after effecting a travel aimed at closing the main circuit 30. In other words, the pivoting of the driving plate 5 with respect to the pivot 17 allows the switching device 50 to be reset.

According to another exemplary embodiment, not depicted, the damping element is formed by the driving plate 5. The driving plate 5 in such a case is then made from a resilient material of the elastomer type.

The damping sought in this embodiment is achieved through the deformation of the driving plate 5 upon contact between the main switch 20 and the strip 15. The elastomeric material is chosen so that the Shore A hardness is comprised between 50 and 90. To guide the rotation of the driving plate 5 about the axis of the pivot 17, a rigid ring is interposed between the driving plate 5 and the axis of the pivot 17 of the connecting element 16. The ring is secured to the driving plate 5. The ring has not been depicted in the figures. The conducting strip 15 is fixed to the driving plate 5 and allows electrical contact with the main switch 20.

FIGS. 9 to 14 describe a second embodiment of the switching system 50. In this embodiment, the contact-maintaining element 6 comprises a sliding-contact element 19 configured to create a sliding electrical contact between the main switch 20 and the driving plate 5 while the driving plate 5 is being driven by the main switch 20. FIGS. 9 to 14 are schematic views from above detailing the main switch 20 and the sliding-contact element 19.

The electrical contact there is between the main switch 20 and the plate 5 by virtue of the sliding-contact element 19 makes it possible to maintain continuity of electrical contact during the movement of the main switch 20. Thus, as in the first embodiment, the mechanical contact as well as the electrical contact between the main switch 20 and the driving plate 5 are maintained. Because the electrical continuity between the main switch 20 and the vacuum breaker 2 is maintained, the formation of a parasitic electric arc is avoided.

The sliding-contact element 19 here is made of metal. The sliding-contact element 19 thus makes it possible to ensure electrical continuity between the main switch 20 and the driving plate 5.

In this second embodiment, the sliding-contact element 19 is secured to the driving plate 5.

The main switch 20 comprises a contact surface 21, and the sliding-contact element 19 is configured to come into contact with the contact surface 21 while the driving plate 5 is being driven by the main switch 20.

The contact surface 21 extends in a plane perpendicular to the axis of rotation D of the main switch 20. In other words, the contact surface 21 and the driving surface 12 providing the driving of the driving plate 5 are distinct and unconnected. The driving surface 12 of the switch 20 ensures the driving of the driving plate 5 by applying pressure to the driving plate 5. The contact surface 21 ensures electrical contact with the sliding-contact element 19.

The main switch 20 comprises an electrical-connection surface 22 configured to be in contact with a fixed contact 35 of the main circuit 30 when the main switch 20 is in the position P1' in which the main circuit 30 is closed, and the electrical-connection surface 22 is adjacent to the contact surface 21.

The electrical-connection surface 22 and the contact surface 21 may partially overlap one another. The electrical-connection surface 22 and the contact surface 21 may be coincident.

More specifically, the main switch 20 comprises a first bar 23 and a second bar 24, the first bar 23 and the second bar 24 being distant from one another and parallel to one another, the first bar 23 and the second bar 24 being in contact with a fixed contact 35 of the main circuit 30 when the main switch 20 is in the position in which the main circuit 30 is closed. The fixed contact 35 of the main circuit 30 is placed between the first bar 23 and the second bar 24 when the main switch 20 is in the position in which the main circuit 30 is closed, and each of the first bar 23 and second bar 24 comprises a contact surface 21, 21', and the sliding-contact element 19 is configured to come into contact with each sliding-contact surface 21, 21' while the driving plate 5 is being driven by the main switch 20. By definition, the position in which the main circuit 30 is closed is the position that allows current to pass in the main circuit 30. This is therefore the position in which the main switch 20 and the fixed contact 35 are in contact. The first bar 23 here is planar. Likewise, the second bar 24 is planar. The first bar 23 and the second bar 24 are made of metal.

Each bar 23, 24 of the main switch 20 comprises an electrical-connection surface 25, 25' configured to be in contact with the fixed contact 35 when the main switch 20 is in the first position P1', and the contact surface 21, 21' is adjacent to the electrical-connection surface 25, 25'.

The contact surface 21' of the second bar 24 is placed facing the contact surface 21 of the first bar 23. The direction in which the contact surface 21 and the contact surface 21' face one another is the direction of the axis of rotation D of the main switch 20.

Figure 9:
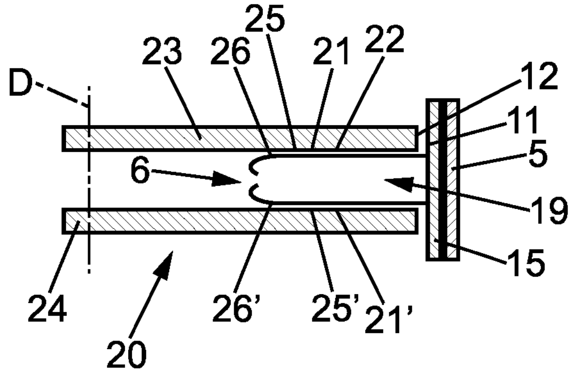
FIG. 9 is a schematic view, from above, of a second embodiment of the invention.
Figure 10:
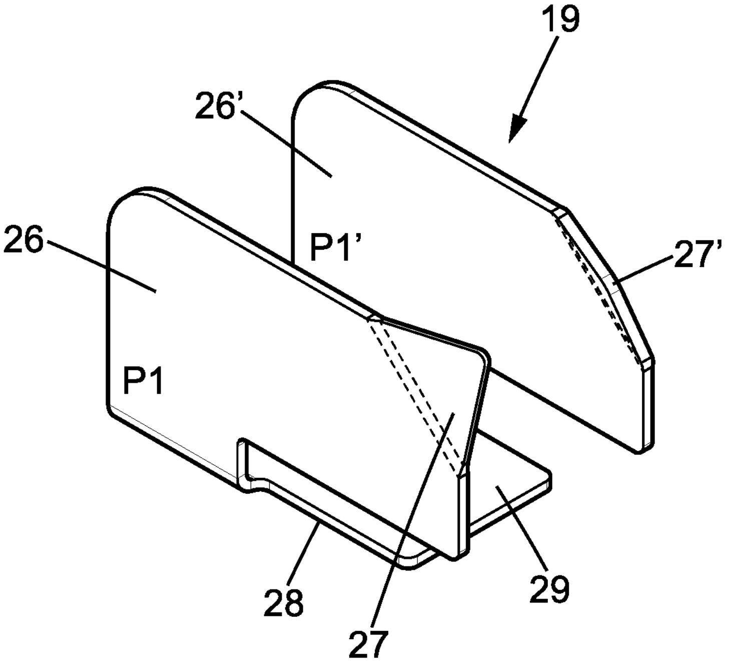
FIG. 10 is a detailed perspective view of the embodiment of FIG. 9.
Figure 11:
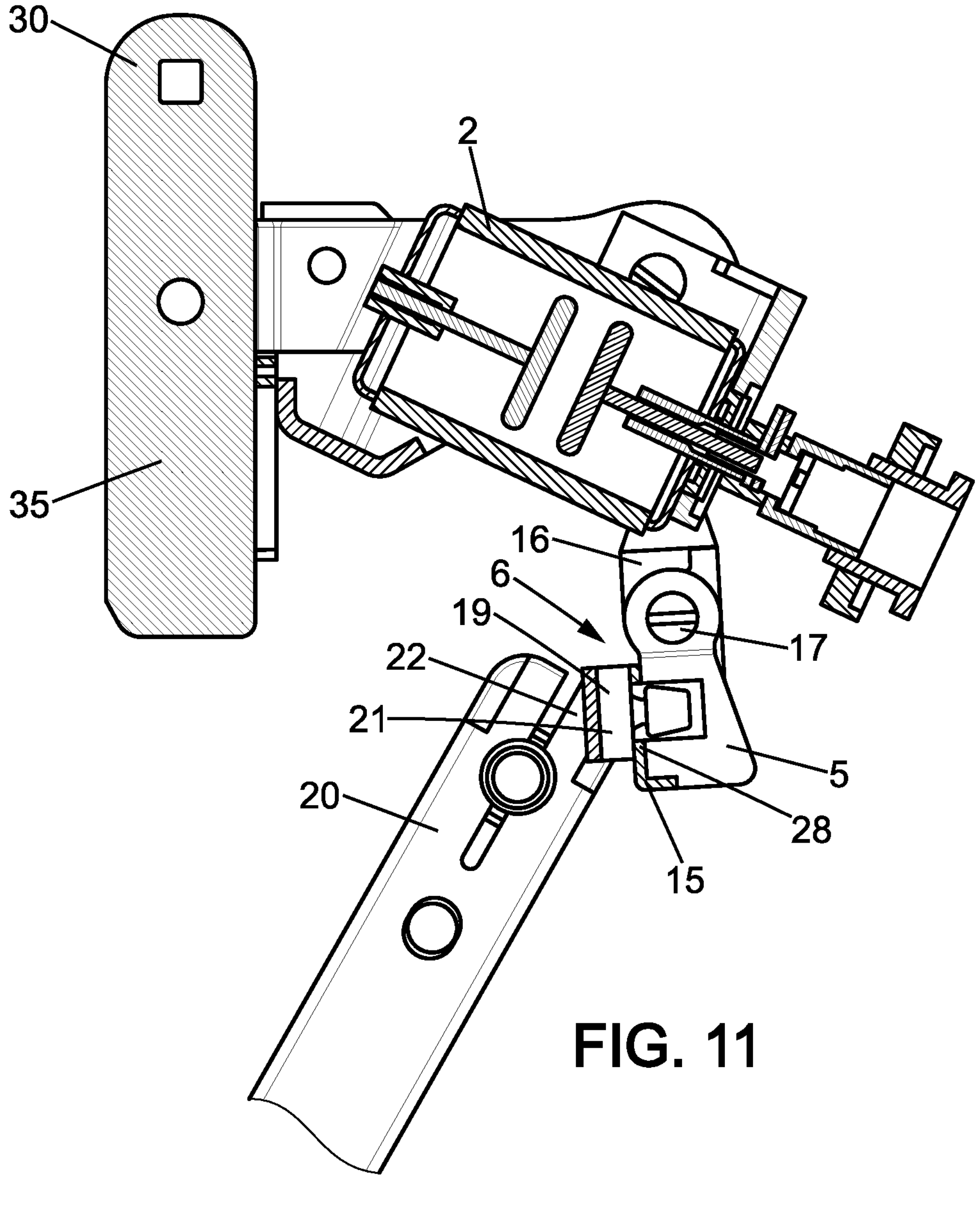
FIG. 11 is a side view of the embodiment of FIGS. 9 and 10.

According to the second embodiment illustrated in FIGS. 9 to 11, the sliding-contact element 19 comprises a flexible blade 26 extending perpendicular to the driving plate 5, the flexible blade 26 being configured to create a sliding contact with the main switch 20.

More specifically, and as indicated schematically in FIG. 9, the sliding-contact element 19 comprises a first flexible blade 26 and a second flexible blade 26'. The first flexible blade 26 is configured to come into contact with a contact surface 21 of the first bar 23 and the second flexible blade 26' is configured to come into contact with a contact surface 21' of the second bar 24.

In other words, the sliding-contact element 19 is inserted between the two bars 23, 24 of the main switch 20. Each of the two flexible blades 26, 26' respectively comes into contact with a bar 23, 24 during the course of the travel of the main switch 20, thereby creating the desired sliding contact.

As detailed in FIG. 10, the first flexible blade 26 comprises an inclined portion 27, the inclined portion 27 facing towards the second flexible blade 26'. Likewise, the second flexible blade 26' comprises an inclined portion 27', the inclined portion 27' facing towards the first flexible blade 26. The inclined portions 27, 27' make it easier to insert the sliding-contact element 19 between the two bars 23, 24.

The sliding-contact element 19 in this example has a U-shaped profile. Each flexible blade 26, 26' forms one branch of the U. The first flexible blade 26 and the second flexible blade 26' thus extend in parallel planes P1, P1'. The first flexible blade 26 and the second flexible blade 26' are connected by a base 29 perpendicular to the plane of the first flexible blade 26 and of the second flexible blade 26'. The base 29 of the U forms a fixing surface 28 for fixing to the driving plate 5. The base 29 of the U comprises a through-hole for the passage of a fixing screw for fixing the sliding-contact element 19 to the driving plate 5.

Figure 12:
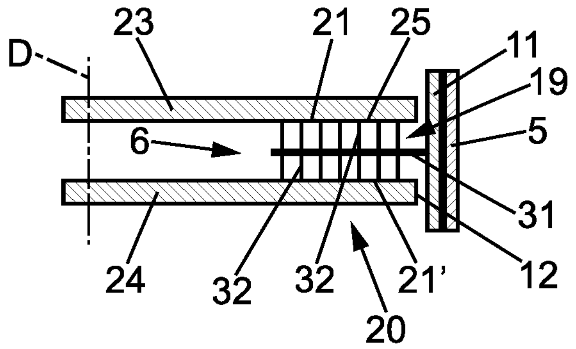
FIG. 12 is a schematic view, from above, of a first variant of the second embodiment of the invention.

According to a first variant of the second embodiment, depicted schematically in FIG. 12, the sliding-contact element 19 comprises a rigid main rod 31 extending perpendicular to the driving plate 5, the main rod 31 is surrounded by a plurality of flexible rods 32 extending transversely to the main rod 31, and the flexible rods 32 are configured to create sliding contact with the main switch 20.

The sliding-contact element 19 in this case comprises a plurality of rows of flexible rods 32 extending axially along the main rod 31. The flexible rods are distributed at 360° all around the main rod 31.

The flexibility of the transverse rods 32 makes it possible to obtain sliding electrical contact between the sliding-contact element 19 and the main switch 20. In addition, the flexibility of the transverse rods allows for easy insertion of the sliding-contact element 19 between the bars 23, 24 of the main switch 20.

Figure 13:
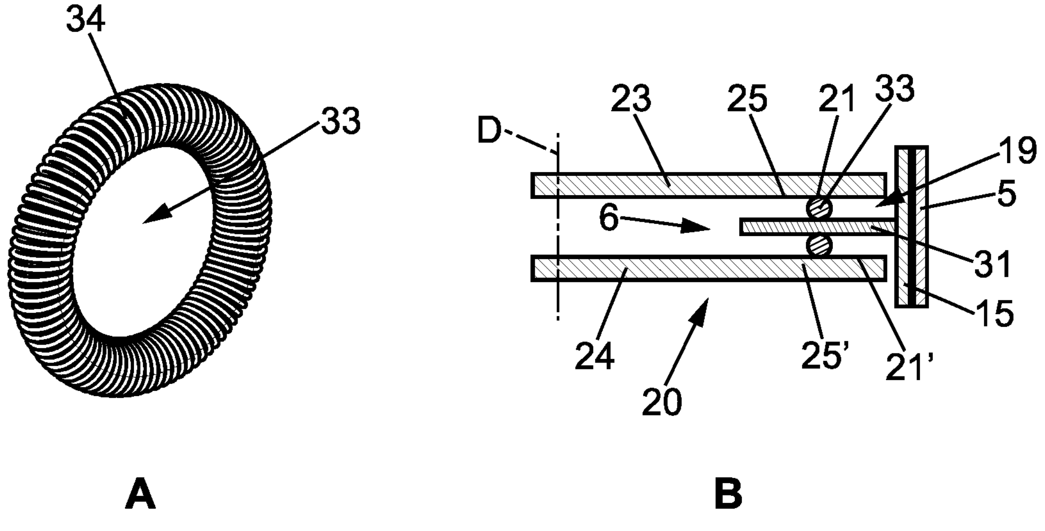
FIG. 13 is a schematic view, from above, of a second variant of the second embodiment of the invention.

According a second variant of this second embodiment, indicated schematically in part B of FIG. 13, the sliding-contact element 19 comprises a rigid main rod 31 extending perpendicular to the driving plate 5, the main rod 31 is surrounded by a spring 33 with angled coils 34, and the angled coils 34 are configured to create sliding contact with the main switch 20.

Like with the preceding variant, the flexibility of the coils 34 of the spring 33 enable the sliding contact between the sliding-contact element 19 and the main switch 20 to be progressive. The spring 33 with inclined coils 34 has the overall shape of a torus. The spring 33 is detailed in part A of FIG. 13.

Figure 14:
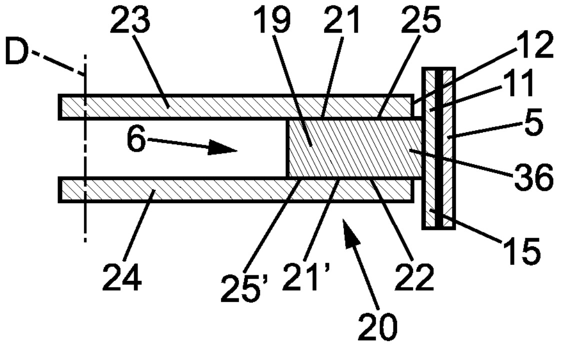
FIG. 14 is a schematic view, from above, of a third variant of the second embodiment of the invention.

According a third variant, indicated schematically in FIG. 14, the sliding-contact element 19 comprises a rigid rod 36 extending perpendicular to the driving plate 5, and the rigid rod 36 is configured to create sliding contact with the main switch 20.

According to one exemplary embodiment, the rigid rod 36 has a rectangular cross section. The rigid rod 36 is chamfered. The chamfers eliminate the right angle at the corners of the rectangular section and make it easier to insert the rigid rod 36 between the bars 23 and 24 of the main switch 20.

According to another exemplary embodiment, the rigid rod 36 has a circular, elliptical or oval cross section. The diameter of the rod is chosen to be slightly greater than the distance between the two bars 23 and 24 so as to create sliding contact when the rod is inserted between the two bars. The sliding-contact element 19 may also be a tube having the same external dimensions as the rigid rod 36 described.

FIGS. 15 to 18 describe a third embodiment of the switching system 50.

In this embodiment of the switching system, the contact-maintaining element 6 comprises an electrically conducting elastically deformable element 41 configured to be elastically stressed in response to the movement of the main switch 20 from the first position P1' to the second position P2' when the distance d between the driving plate 5 and the main switch 20 becomes smaller than a predetermined distance S. The elastically deformable element is a contact element, which is to say an element ensuring mechanical and electrical contact with the main switch 20.

The elastically deformable element is also configured to relax elastically in response to an increase in the distance d between the driving plate 5 and the main switch 20 so as to maintain contact between the driving plate 5 and the main switch 20.

The elastically deformable element is interposed between the driving plate 5 and the main switch 20. The elastically deformable element is electrically conducting. The predetermined distance S is comprised between 2 millimetres and 6 millimetres.

The natural frequency of the elastically deformable element 41 is higher than 2000 Hz.

This minimum value for the natural frequency allows the elastically deformable element 41 to maintain contact with the driving plate 5 if the latter moves away from the main switch 20 as a result of the initial impact shock between these two components during the driving phase. In other words, this value for the natural frequency allows the elastically deformable element to remain constantly in contact with the main switch 20, even if a bounce phenomenon exists. Specifically, the natural frequency of the elastically deformable element is very much greater than the frequency of any bouncing there might be of the driving plate, for example by a factor comprised between 5 and 10.

According to one exemplary embodiment of the switching system 50, illustrated in FIGS. 15 to 18, the elastically deformable element 41 is connected to the main switch.

Figure 16:
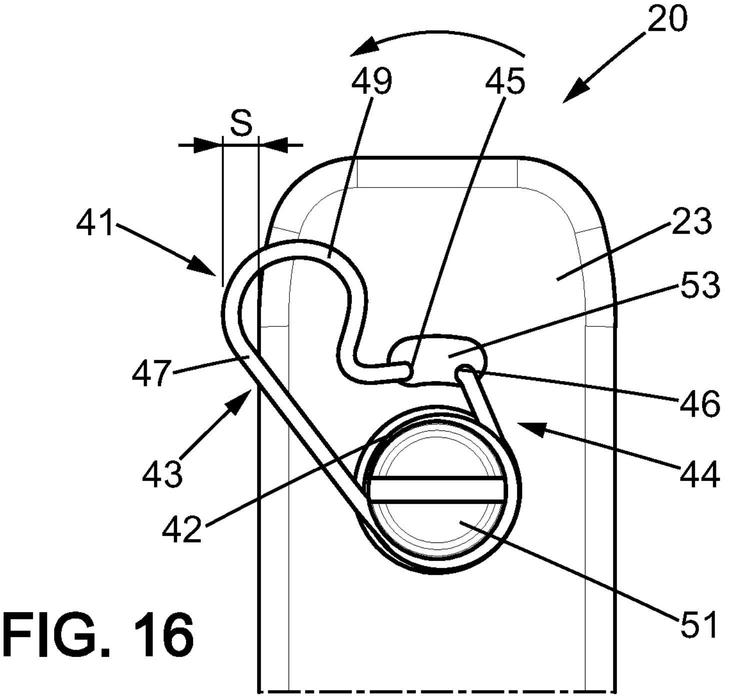
FIG. 16 is a detailed side view of a main switch of the switching system of FIG. 15.

The elastically deformable element 41 comprises a projecting portion projecting from the main switch 20 in the direction of travel of the main switch 20 from the first position P1' to the second position P2'. A portion of the elastically deformable element 41 thus protrudes beyond the edge of the bars 23, 24 facing the driving plate 5. In FIG. 16, the symbol S schematically indicates the extent to which the elastically deformable element 41 protrudes beyond the edge of the main switch 20. The arrow in broken line indicates the direction of rotation of the main switch 20 as it passes from the position P1' allowing the passage of current in the main circuit 30 to the position P2' preventing the passage of current.

Figure 15:
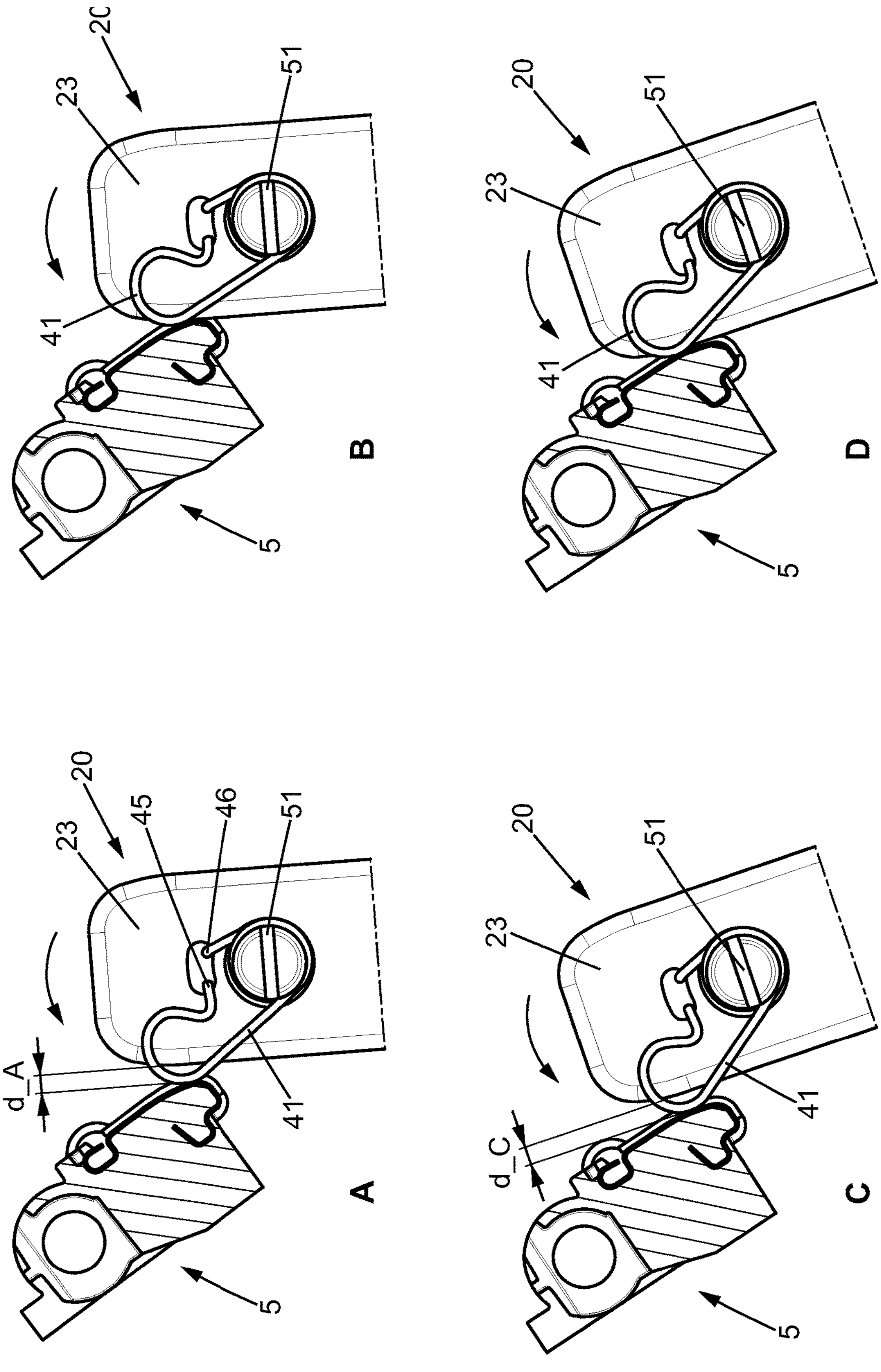
FIG. 15 is a side view illustrating the operation of a switching system according to a third embodiment.

The various views in FIG. 15 illustrate the way in which the elastically deformable element 41 acts. In this figure, views A to D indicate, in chronological order, the relative position of the main switch 20 and of the driving plate 5. It will be noted that the direction of rotation of the main switch 20, indicated schematically by a curved arrow in dotted line, is the opposite of that of FIGS. 3 to 6. The elastically deformable element 41 defines a zone of initial contact between the main switch 20 and the driving plate 5 as the main switch 20 makes the transition from the first position P1' to the second position P2'. In part A of FIG. 15, the first bar 23 of the main switch 20 is still distant from the plate 5 when the elastically deformable element 41 comes into contact with the surface of the plate 5. The distance d between the main switch 20 and the driving plate 5 at the instant corresponding to part A of FIG. 15 is indicated by the sign d_A. Once the initial mechanical contact has been established, the remainder of the travel of the main switch 20 deforms the elastically deformable element 41, stressing it. In part B of FIG. 15, the deformation of the elastically deformable element 41 is at its maximum and the edge of the first bar 23 of the main switch 20 comes into contact with the driving plate 5. The distance between the first bar 23 and the driving plate 5 is therefore zero. The impact shock between the main switch 20 and the driving plate 5 may cause the driving plate 5 to bounce back off the main switch 20 causing the driving plate 5 to move away from the main switch 20, which means that these two components cease being in contact and the distance between these two components becomes non-zero, as illustrated in part C. The symbol d_C schematically indicates the non-zero distance d between the main switch 20 and the driving plate 5. The elastically deformable element 41 is relaxed and continues to be in contact with the driving plate 5. During this phase, mechanical contact, and, therefore, electrical contact, between the main switch 20 and the driving plate 5 is maintained through the agency of the elastically deformable element 41. In part D, the main switch 20 has caught up with the driving plate 5 and is once again in contact therewith. The elastically deformable element 41 is once again compressed to the maximum extent. Just a single bounce is illustrated here although the mechanism of action is the same when there are a number of successive bounces. The predetermined distance S is selected so that it is greater than the maximum amplitude of bounce-back of the driving plate 5 with respect to the main switch 20. Thus, the elastically deformable element may remain in contact with the main switch thanks to the succession of compression and relaxation phases, and maintain electrical contact. The stiffness of the elastically deformable element is chosen to be low enough that it does not prevent the main switch 20 from touching the driving plate 5. In other words, the stiffness of the elastically deformable element allows zero clearance between the main switch 20 and the driving plate 5. When this clearance is zero, the deformation of the elastically deformable element is at its maximum.

The elastically deformable element 41 here is a torsion spring. The elastically deformable element 41 is formed from metal wire. The diameter of the metal wire is between 0.5 millimetres and 3 millimetres.

The torsion spring 41 is made from a copper and beryllium alloy. This alloy is able to provide good elastic properties and good thermal resistance so that the torsion spring is able to withstand the heating created by the transient passage of the electrical current upon each opening (breaking) of the main electric circuit 30 through movement of the main switch 20.

Figure 17:
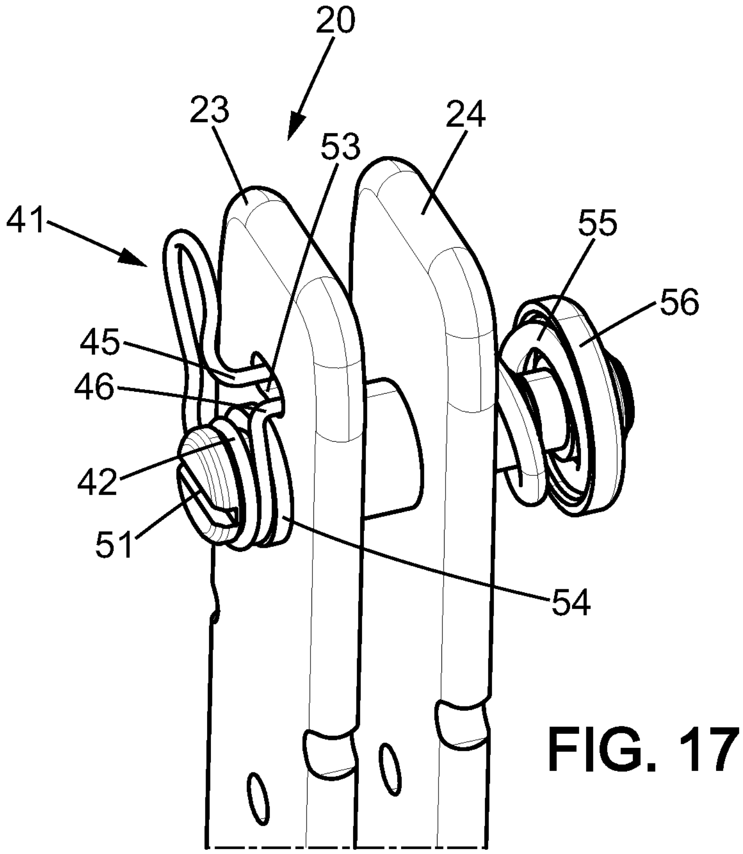
FIG. 17 is a detailed perspective view of a main switch of the switching system of FIG. 15.

FIG. 17 details the main switch 20. The main switch 20 comprises a first bar 23 and a second bar 24, the first bar 23 and the second bar 24 being distant from one another and parallel to one another. The first bar 23 and the second bar 24 are in contact with a fixed contact 35 of the main circuit 30 when the main switch 20 is in the position in which the main circuit 30 is closed. The first bar 23 and the second bar 24 are connected by a transverse connecting spindle 51. The connecting spindle 51 passes through a coil 42 of the torsion spring 41.

The first bar 23 and the second bar 24 are flat rectilinear elements. The first bar 23 and the second bar 24 extend in parallel planes and are placed facing one another in a direction transverse to the plane in which they extend.

The connecting shaft 51 passes transversely through the first bar 23 and the second bar 24 of the main switch 20. The connecting shaft 51 is connected to the first bar 23. A shoulder 54 of the connecting shaft 51, detailed in FIG. 18, bears against the lateral surface of the first bar 23 which is the opposite surface to the second bar 24. A helical spring 55 ensures sufficient contact pressure between the two bars 23, 24 and the fixed contact 35 to ensure the quality of the electrical connection between the mobile elements of the main switch 20 and the fixed contact 35.

Figure 18:
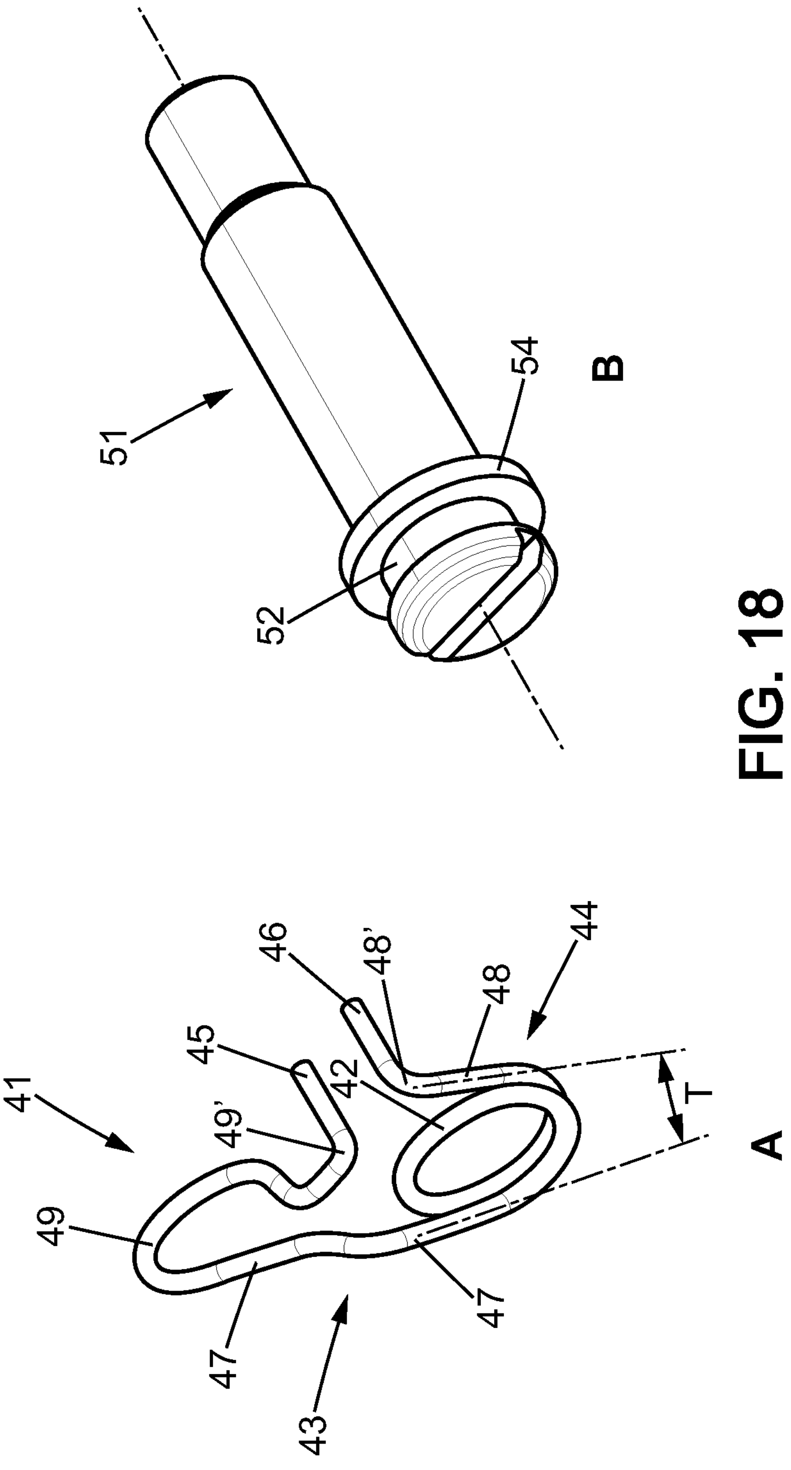
FIG. 18 is a detailed perspective view of components of the main switch of the switching system of FIG. 15.

As detailed in part B of FIG. 18, the connecting spindle 51 connecting the first bar 23 and the second bar 24 comprises a groove 52 to receive the coil 42 of the torsion spring 41. The coil 42 of the torsion spring 41 is received in the receiving groove 52 of the connecting spindle 51 that connects the first bar 23 and the second bar 24. The torsion spring 41 is thus held in place with respect to the connecting spindle 51 without the addition of further components.

As illustrated notably in FIG. 16, the torsion spring 41 comprises a first strand 43 and a second strand 44 which are connected by a coil 42. An end portion 45 of the first strand 43 is placed in a cutout 53 in the first bar 23 and an end portion 46 of the second strand 44 is placed in the cutout 53 of the first bar 23.

The torsion spring 41 is thus held in place with respect to the first bar 23 without the addition of further components. In addition, the choice of the size of the cutout makes it possible to regulate the amount of preload, or prestress, in the torsion spring 41.

The end portion 45 of the first strand 43 and the end portion 46 of the second strand 44 extend in parallel directions. The end portion 45 of the first strand 43 and the end portion 46 of the second strand 44 are parallel to the connecting spindle 51 connecting the first bar 23 and the second bar 24. The axis of the coil 42 is parallel to the end portion 45 of the first strand 43 and the end portion 46 of the second strand 44.

This makes the placement of the coil 42 of the retaining spring 41 in the receiving groove 52 of the connecting spindle 51 and the placement of the ends of the torsion spring 41 in the cutout 53 in the first bar 23 easier. Specifically, the coil 42 of the torsion spring can be inserted into the groove 52 of the connecting spindle 51, and the two end portions 45 and 46 of the torsion spring 41 are introduced simultaneously into the cutout 53. The deformation of the torsion spring 41 while it is being fitted can be achieved using a tool or by hand.

The end portion 45 of the first strand 43 and the end portion 46 of the second strand 44 extend longitudinally on the one same side of the plane in which the first strand 43 and the second strand 44 extend. In other words, the two end portions 45, 46 of the torsion spring 41 both point in the same direction.

The cutout 53 here is oblong in shape. As an alternative, the cutout 53 may be rectangular in shape.

As detailed in part A of FIG. 18, the first strand 43 comprises a substantially rectilinear portion 47 adjacent to the coil 42 and a bent portion 49, the bent portion 49 being extended by a connecting portion 49' connecting it to the end portion 45 of the first strand 43. The substantially rectilinear portion 47 of the first strand 43 and the bent portion 48 extend in a plane substantially perpendicular to an axis of the coil 42. The second strand 44 comprises a substantially rectilinear portion 48 adjacent to the coil 42 and a connecting portion 48' connecting it to the end portion 46 of the second strand 44. In the unconstrained state, the substantially rectilinear portion 47 of the first strand 43 and the rectilinear portion 48 of the second strand 44 form an angle T of between 0° and 40°.

The torsion spring 41 is preloaded here. In other words, a force greater than the preload force needs to be exerted in order to increase the elastic deformation of the torsion spring 41. The preload in the torsion spring 41 is between 15 newtons and 50 newtons, and notably around 25 newtons. The preloading of the torsion spring 41 makes it possible to ensure good electrical contact with the driving plate 5 if the driving plate 5 bounces off the main switch 20. The preload in the torsion spring 41 is between 5° and 30°. This corresponds to a closing-up of the angle T.

Figure 19:
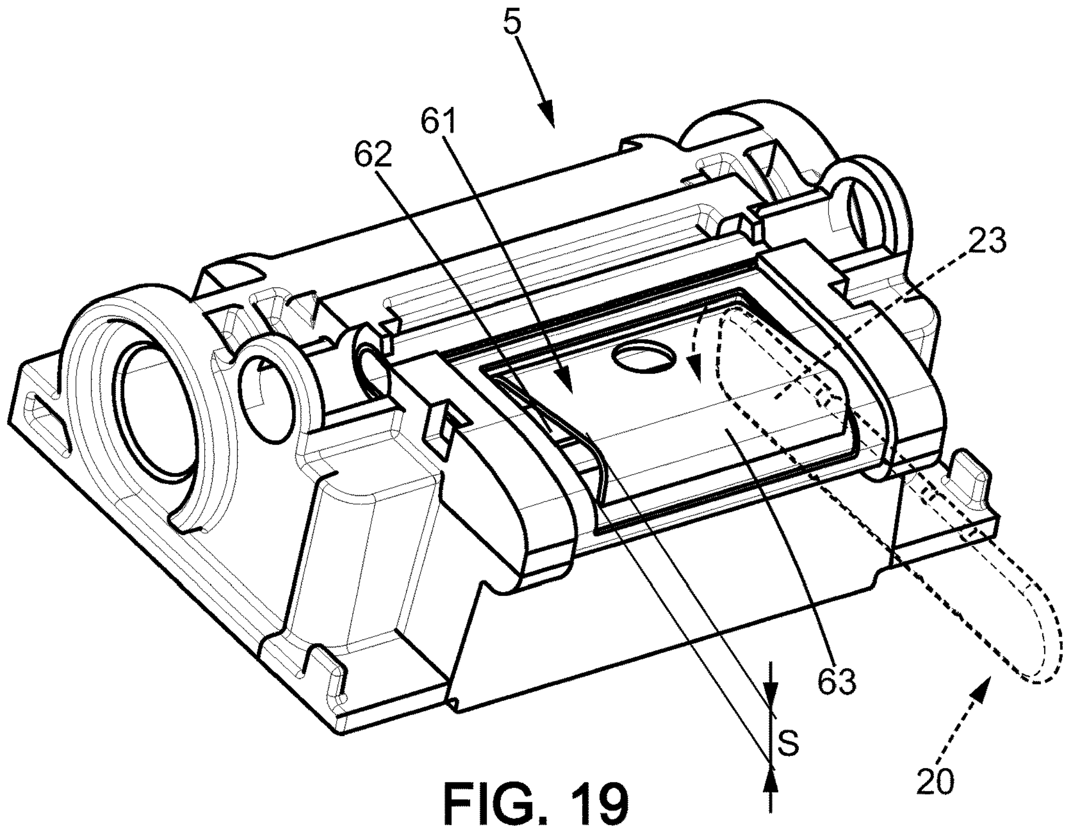
FIG. 19 is a perspective partial view of a switching system according to a fourth embodiment.
Figure 20:
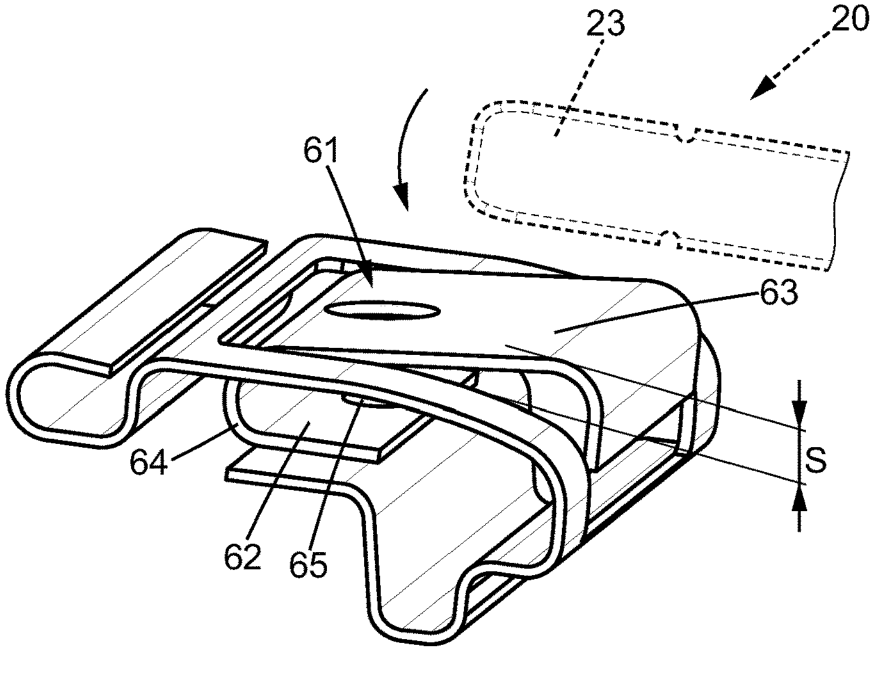
FIG. 20 is another partial view, in perspective, of the switching system of FIG. 19.

FIG. 19 and FIG. 20 illustrate a fourth embodiment of the switching system 50. In this embodiment, the elastically deformable element is connected to the driving plate 5. The elastically deformable element projects from the driving plate 5. The elastically deformable element is an elastic strip 61 configured to deform in bending. As in the third embodiment, the elastically deformable element is therefore a contact element, which is to say an element ensuring mechanical and electrical contact with the main switch 20.

The elastic strip 61 has a first portion 62 rigidly connected to the driving plate 5 and a free second portion 63. The free portion 63 of the elastically deformable strip 61 projects from the driving plate 5.

The free portion 63 comprises a portion 64 bent into a U-shape. The bent-over portion 64 is adjacent to the portion 62 that is rigidly connected to the driving plate 5.

Figure 21:
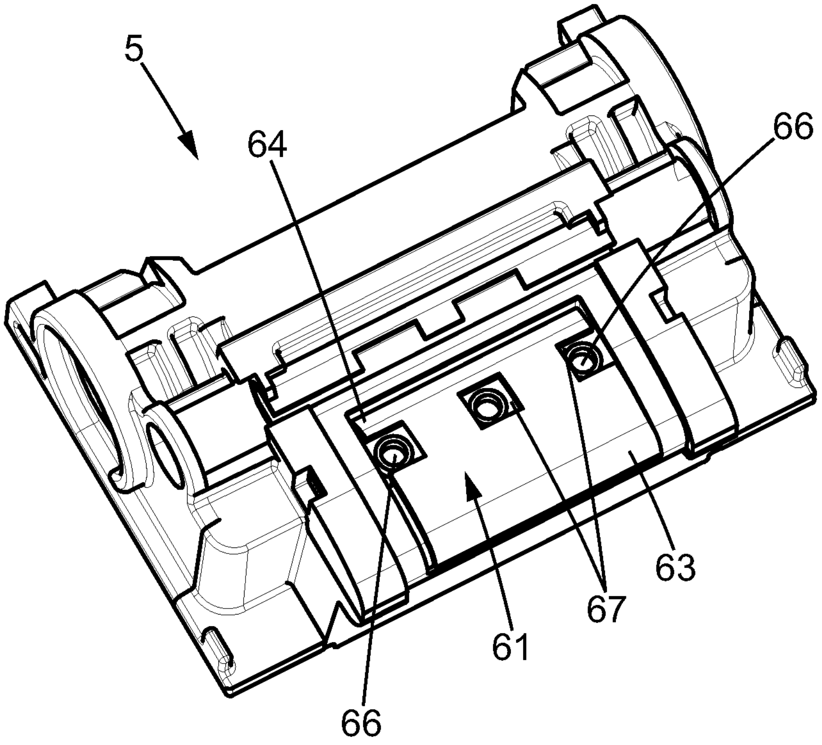
FIG. 21 is a partial view, in perspective, of a variant of the switching device of FIG. 19.

The elastic strip 61 here is screw fastened into the driving plate 5. In FIG. 20, the symbol 65 designates the through-hole for the fixing screw used to fix the elastic strip 61 to the driving plate 5. FIG. 21 illustrates a variant in which the elastic strip 61 is fixed using three fixing screws 66. The elastic strip 61 comprises three through-holes 67 through which the tightening tool can pass. According to another variant which has not been depicted, part of the elastic strip 61 is overmoulded with the material from which the driving plate 5 is formed. No fixing screw is then needed. For example, the part which, in FIG. 19, receives the head of the fixing screw can be overmoulded.

The elastic strip 61 is made from a copper and beryllium alloy. The thickness of the elastic strip is comprised is between 0.3 millimetres and 0.8 millimetres. The length of the free portion of the elastic strip 61 is comprised between 1 centimetre and 5 centimetres. The width of the free portion of the elastic strip 61 is comprised between 1 centimetre and 6 centimetres.

When the main electric circuit 30 is opened (broken), the main switch 20 first of all comes into contact with the free portion 63 of the elastic strip 61, which projects from the driving plate 5, as indicated in FIG. 19 and FIG. 20. In these figures, only the first bar 23 of the main switch 20 has been depicted, and the arrow indicated in dotted line indicates the direction of travel of the main switch 20 during opening (breaking) of the main circuit 30. The operation is similar to that of the first embodiment variant. The main switch 20 deforms the elastic strip 61 until this strip comes into abutment with the driving plate 5. Once the main switch 20 is driving the driving plate 5, the free portion 63 of the elastic strip 61 maintains contact with the first bar 23 and the second bar 24 of the main switch 20. Specifically, if the distance between the driving plate 5 and the bars 23, 24 of the main switch 20 increases, on account of a bounce phenomenon associated with the impact shock between the components, the free portion 63 relaxes and remains in contact with the bars 23, 24 of the main switch 20. Mechanical and, therefore, electrical, contact is thus maintained. The protrusion S of the free portion 63 when unconstrained, the thickness of the elastic strip, and the length of the free portion 63, enable the dynamic behaviour of the elastic strip 61 to be adapted so as to compensate for any bouncing of the driving plate 5. The protrusion S in the unconstrained state is comprised between 1 millimetre and 5 millimetres, and is more particularly equal to 3 millimetres.

According to a variant of the fourth embodiment, the switching system comprises an additional damping element configured to limit the acceleration of the driving plate 5 while the driving plate 5 is being driven by the main switch 20.

The contact-maintaining element therefore comprises the elastic strip 61 and the additional damping element which together ensure mechanical and electrical contact with the main switch 20.

The damping element has, for example, the properties of that described in the first embodiment of FIGS. 2 to 8.

The damping element is interposed between the free portion 63 of the elastic strip 61 and the driving plate 5. The damping element is also able to improve performance by being compressed when the main switch 20 applies force to the elastic strip 61. When the plate 5 is being driven by the main switch 20, the free portion 63 of the elastic strip 61 is deformed until such point as it comes into contact with the additional damping element, and then the additional damping element is compressed.

The damping element thus makes it possible to minimize still further the bounce phenomenon and thus improve the electrical and mechanical contact as the main switch 20 makes the transition from the first position P1' to the second position P2'.

In this variant, the protrusion S of the free portion 63 in the unconstrained state is comprised between 1 millimetre and 5 millimetres, and is more particularly equal to 2 millimetres. The additional damping element is not depicted in FIG. 20 and is not visible in FIGS. 19 and 21 because it is hidden by the elastic strip 61.

The invention claimed is:

1. A switching system for comprising:

a vacuum breaker comprising:

a fixed electrode, and a mobile electrode, configured to move between a closed position in which the fixed electrode and the mobile electrode are in contact with each other so as to allow electrical current to pass, and an open position in which the fixed electrode and the mobile electrode are separated from each other so as to prevent electrical current from passing;

a driving plate connected to the mobile electrode for driving the mobile electrode;

a main switch to move between a first position allowing electrical current to pass in a main electric circuit of the electrical device and a second position preventing electrical current from passing in the main electric circuit, the main switch being configured to drive the driving plate during a transition from the first position to the second position, so as to cause the mobile electrode to make the transition from the closed position to the open position; and a contact-maintaining element configured to maintain mechanical and electrical contact between the driving plate and the main switch and limit acceleration of the driving plate while the driving plate is being driven by the main switch.

2. The switching system according to claim 1, wherein the contact-maintaining element comprises an electrically conducting elastically deformable element configured to be elastically stressed in response to a movement of the main switch from the first position to the second position.

3. The switching system according to claim 2, wherein the elastically deformable element is connected to the main switch, and wherein the elastically deformable element comprises a projecting portion projecting from the main switch in a direction of travel of the main switch from the first position to the second position.

4. The switching system according to claim 2, wherein the elastically deformable element is a torsion spring, wherein the main switch comprises a first bar and a second bar, the first bar and the second bar being distant from each other, and wherein the torsion spring comprises a first strand and a second strand which are connected by a coil, wherein an end portion of the first strand is placed in a cutout in the first bar, and wherein an end portion of the second strand is placed in the cutout of the first bar.

5. The switching system according to claim 2, wherein the elastically deformable element is connected to the driving plate, the elastically deformable element projecting from the driving plate.

6. The switching system according to claim 5, wherein the elastically deformable element is an elastic strip configured to deform in bending.

7. The switching system according to claim 1, wherein the contact-maintaining element comprises a damping element configured to limit the acceleration of the driving plate while the driving plate is being driven by the main switch.

8. The switching system according to claim 7, wherein the contact-maintaining element is secured to the driving plate.

9. The switching system according to claim 7, wherein the main switch and the driving plate are configured so that the main switch drives the plate via the contact-maintaining element.

10. The switching system according to claim 7, wherein the contact-maintaining element comprises an elastomer block.

11. The switching system according to claim 7, wherein: the driving plate comprises a bearing surface, the main switch comprises a driving surface, configured to be in contact with the bearing surface while the main switch is making the transition from the first position to the second position, wherein the main switch is able to rotate about an axis and comprises an end portion, opposite to the axis, and wherein the driving surface is adjacent to the end portion, and wherein the contact-maintaining element comprises the bearing surface of the driving plate.

12. The switching system according to claim 7, comprising a connecting element connecting the driving plate to the mobile electrode, wherein the damping element is positioned between the connecting element and the driving plate.

13. The switching system according to claim 1, wherein the contact-maintaining element comprises a sliding-contact element configured to create a sliding electrical contact between the main switch and the plate while the driving plate is being driven by the main switch, and wherein the sliding-contact element is secured to the driving plate.

14. The switching system according to claim 13, wherein the main switch is configured to rotate about an axis and comprises a contact surface, wherein the sliding-contact element is configured to come into contact with the contact surface while the driving plate is being driven by the main switch, and wherein the contact surface extends in a plane perpendicular to the axis of rotation of the main switch.

15. The switching system according to claim 13, wherein the main switch comprises a first bar and a second bar, the first bar and the second bar being distant from each other and parallel to each other, the first bar and the second bar being in contact with a fixed contact of a main circuit when the main switch is in the position in which the main circuit is closed, wherein the fixed contact of the main circuit is placed between the first bar and the second bar when the main switch is in the position in which the main circuit is closed, wherein each of the first bar and second bar comprises a contact surface, and wherein the sliding-contact element is configured to come into contact with each contact surface while the driving plate is being driven by the main switch.

16. The switching system according to claim 13, wherein the sliding-contact element comprises a first flexible blade and a second flexible blade, wherein the first flexible blade is configured to come into contact with a contact surface of the first bar and wherein the second flexible blade is configured to come into contact with a contact surface of the second bar.

17. The switching system according to claim 13, wherein the sliding-contact element comprises a rigid main rod extending perpendicular to the driving plate, the main rod being surrounded by a plurality of flexible rods extending transversely to the main rod, the flexible rods being configured to create friction against the main switch.

18. The switching system according to claim 13, wherein the sliding-contact element comprises a rigid main rod extending perpendicular to the driving plate, the main rod being surrounded by a spring with angled coils, the angled coils being configured to create contact with the main switch.

19. The switching system according to claim 13, wherein the sliding-contact element comprises a rigid rod extending perpendicular to the driving plate, the rigid rod being configured to create contact with the main switch.

20. An electrical device comprising the switching system according to claim 1, wherein the vacuum breaker is placed in parallel with the main switch.

* * * * *